(12) United States Patent
Izumi

(10) Patent No.: US 9,535,512 B2
(45) Date of Patent: *Jan. 3, 2017

(54) IMAGE RECOGNITION APPARATUS, OPERATION DETERMINING METHOD AND COMPUTER-READABLE MEDIUM

(71) Applicant: SHIMANE PREFECTURAL GOVERNMENT, Matsue-shi, Shimane (JP)

(72) Inventor: Kenji Izumi, Matsue (JP)

(73) Assignee: SHIMANE PREFECTURAL GOVERNMENT, Matsu-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/522,087

(22) Filed: Oct. 23, 2014

(65) Prior Publication Data

US 2015/0130715 A1    May 14, 2015

Related U.S. Application Data

(63) Continuation of application No. 13/384,682, filed as application No. PCT/JP2010/005058 on Aug. 12, 2010, now Pat. No. 8,890,809.

(30) Foreign Application Priority Data

Aug. 12, 2009 (JP) ................. 2009-187449

(51) Int. Cl.
    *G06F 3/03* (2006.01)
    *G06F 3/01* (2006.01)
(52) U.S. Cl.
    CPC ............. *G06F 3/0304* (2013.01); *G06F 3/017* (2013.01); *G06F 3/0317* (2013.01)

(58) Field of Classification Search
    CPC ....... G06F 3/0304; G06F 3/017; G06F 3/0317
    See application file for complete search history.

(56) References Cited

U.S. PATENT DOCUMENTS 6,434,255 B1 * 8/2002 Harakawa ............... G06F 3/011
                                                    348/169
6,911,995 B2   6/2005 Ivanov et al.
(Continued)

FOREIGN PATENT DOCUMENTS

JP       A-6-12177        1/1994
JP       A-2004-13314     1/2004
(Continued)

OTHER PUBLICATIONS

Kanatsugu, Yasuaki et al., "A method for specifying cursor position by finger pointing," ITE Technical Report, Jan. 2002, vol. 26, No. 8, pp. 55-60 (with English Abstract).

(Continued)

*Primary Examiner* — Tom Sheng
(74) *Attorney, Agent, or Firm* — Oliff PLC

(57) ABSTRACT

An accurate determination of an operation is possible. Data photographed by a video camera is read by an image reading unit, and an image of an operator is extracted from the data by an image extracting unit. As a result of such preparation, a virtual operation screen and an operation region are created based upon the extracted image of the operator. In a case of an adult operator, an operation region can be created in consideration with a length (position of sight line) or a length of an arm, and in a case of a child, since a length is lower and a length of an arm is shorter, an operation region can be set to match it.

5 Claims, 31 Drawing Sheets

(56) References Cited

U.S. PATENT DOCUMENTS

| | | | |
|---|---|---|---|
| 7,084,855 B2* | 8/2006 | Kaku | G09B 9/302 345/158 |
| 7,970,204 B2 | 6/2011 | Sawachi | |
| 8,289,316 B1* | 10/2012 | Reisman | G06F 3/0425 345/173 |
| 8,890,809 B2* | 11/2014 | Izumi | G06F 3/017 345/157 |
| 2001/0026645 A1* | 10/2001 | Hiramatsu | G06F 3/0386 382/291 |
| 2001/0043719 A1 | 11/2001 | Harakawa et al. | |
| 2002/0041327 A1 | 4/2002 | Hildreth et al. | |
| 2003/0142068 A1 | 7/2003 | DeLuca et al. | |
| 2004/0242988 A1 | 12/2004 | Niwa et al. | |
| 2007/0098253 A1 | 5/2007 | Crespi et al. | |
| 2007/0252832 A1 | 11/2007 | Ratai | |
| 2008/0100572 A1 | 5/2008 | Boillot | |
| 2008/0143676 A1* | 6/2008 | Choi | G06F 3/017 345/158 |
| 2008/0225007 A1* | 9/2008 | Nakadaira | G06F 3/04815 345/173 |
| 2008/0266257 A1* | 10/2008 | Chiang | G06F 1/1626 345/163 |
| 2008/0288895 A1 | 11/2008 | Hollemans et al. | |
| 2009/0109178 A1* | 4/2009 | Kim | H04N 5/23203 345/166 |
| 2009/0183125 A1 | 7/2009 | Megal et al. | |
| 2010/0315413 A1 | 12/2010 | Izadi et al. | |
| 2011/0083089 A1* | 4/2011 | Pahud | G06F 3/0425 715/765 |
| 2011/0141009 A1 | 6/2011 | Izumi | |
| 2012/0056989 A1 | 3/2012 | Izumi | |

FOREIGN PATENT DOCUMENTS

| | | |
|---|---|---|
| JP | A-2004-78977 | 3/2004 |
| JP | A-2006-209359 | 8/2006 |

OTHER PUBLICATIONS

International Search Report issued in International Patent Application No. PCT/JP2010/005058 dated Oct. 26, 2010.

International Preliminary Report on Patentability issued in International Patent Application No. PCT/JP2010/005058 dated Oct. 26, 2010 (with translation).

Feb. 6, 2015 Extended Search Report issued in European Patent Application No. 10808086.2.

* cited by examiner

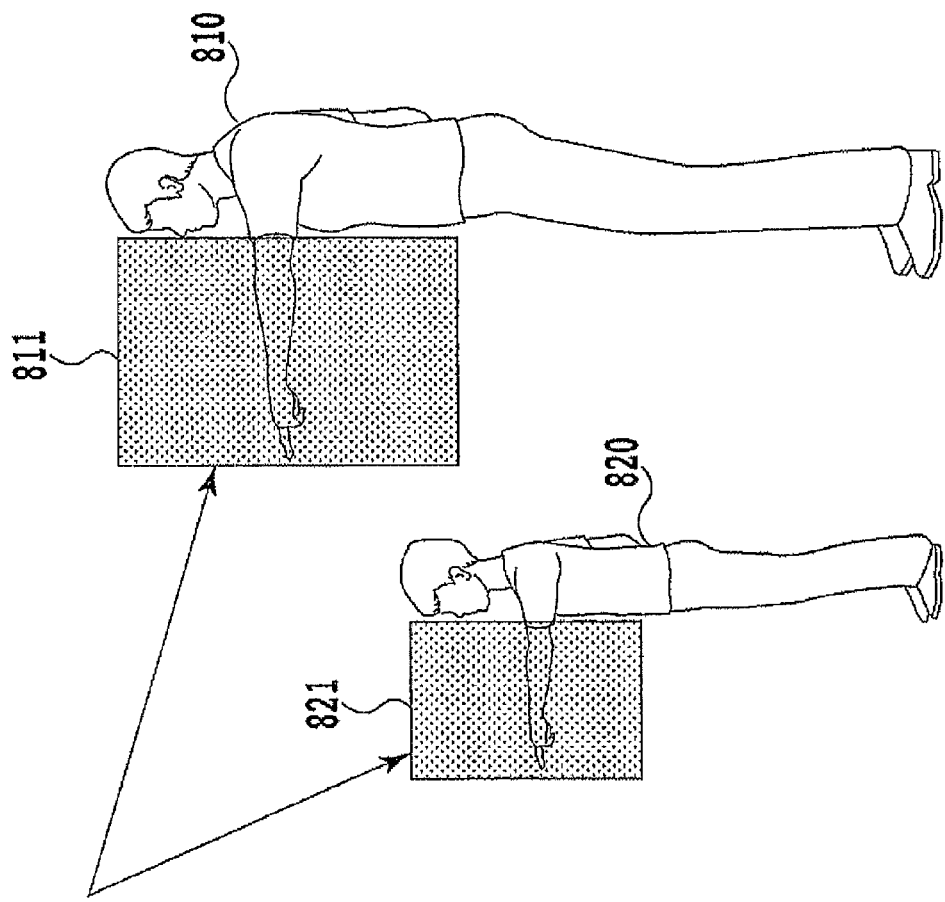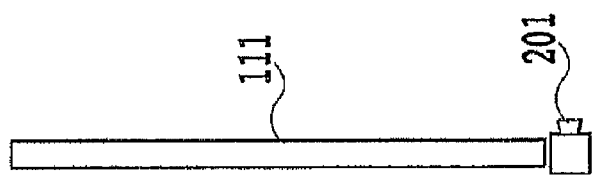
FIG.8

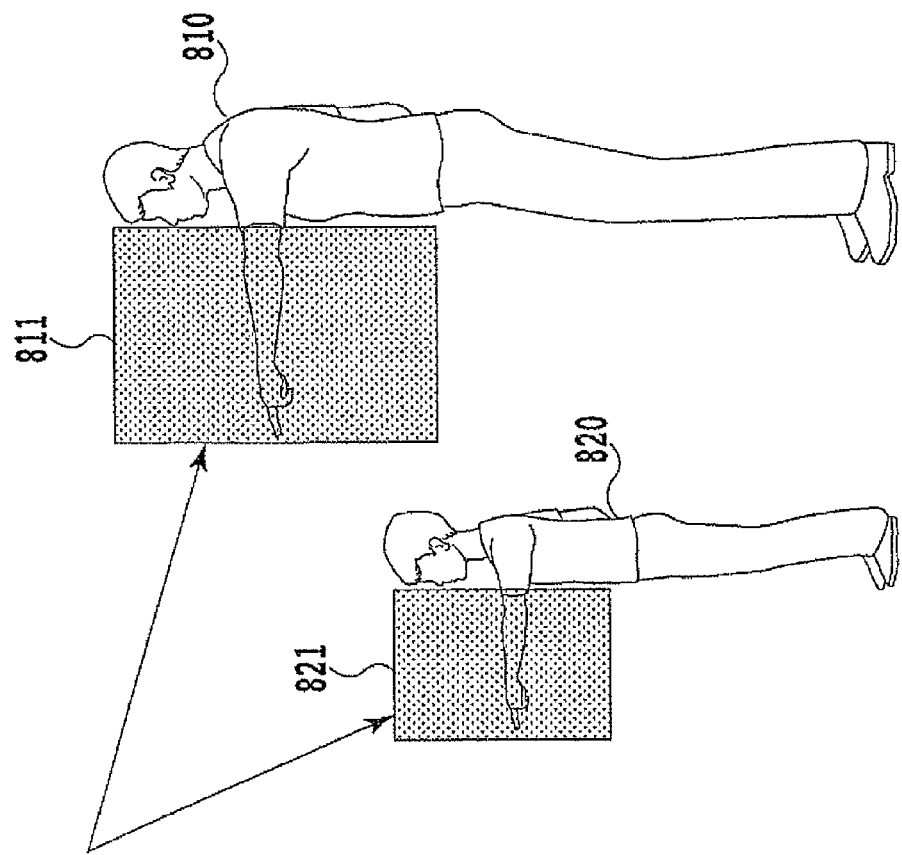
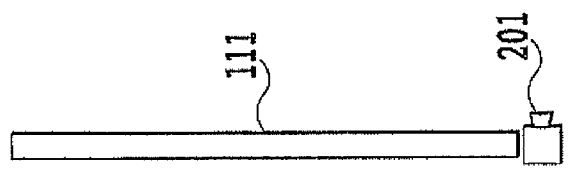
FIG.9

IMAGE RECOGNITION APPARATUS, OPERATION DETERMINING METHOD AND COMPUTER-READABLE MEDIUM

This is a Continuation application of application Ser. No. 13/384,682 filed Jan. 18, 2012 which is a National Phase of PCT/JP2010/005058 filed Aug. 12, 2010. The disclosure of the prior application are hereby incorporate by reference herein in its entirety.

TECHNICAL FIELD

The present invention relates to an image recognition apparatus and an operation determining method, and in more detail, to an image recognition apparatus and an operation determining method for determining a movement of a measurement target from an image photographed by a video camera or the like.

BACKGROUND ART

In recent years, there are proposed various devices and processes as interfaces between computers or electronic devices and human beings, that is, machine interfaces, and particularly in a game machine or an operation guide device, there is proposed a technology in which an entirety or a part of an operator is photographed by a camera and an intention of the operator is determined in accordance with the photographed image to operate the game machine or the operation guide device. For example, Patent Literature 1 proposes a technology in which there are provided a host computer for recognizing a configuration and a movement of an object in an image photographed by a CCD camera and a display device for displaying the configuration and the movement of the object recognized by the host computer, wherein, when a user faces the CCD camera and gives an instruction by hand waving, the given hand waving is displayed on a display screen of the display device, a virtual switch and the like displayed on the display screen can be selected with an icon of an arrow mark cursor by the hand waving, and a very simple operation of the device is possible without necessity of an input device such as a mouse.

In recent years, there is further proposed an input system in which a movement or a configuration of a hand-finger is recognized as some kind of gesture from an image in which the movement or the configuration is photographed, thereby performing an operation input. For example, in an input device which can be used in the presentation by a screen operation by a gesture or in a non-contact kiosk terminal not requiring a touch panel, when an operator facing a large screen performs various operations toward a camera usually installed in a position of a screen lower part, the content is mirrored on the large screen. The configuration and the movement of the operator are extracted from the image photographed in this manner by a method known in the present technology field, which are compared with, for example, a pattern predetermined and stored in a data base. Thereby the meaning of the configuration or the movement of the operator is determined, which is used for control of the device.

On the other hand, a technology of taking an image of an operator, as shown in FIG. 13, makes it possible to photograph an operator with a camera adapted for a three-dimensional or stereoscopic photography to reproduce a stereoscopic image, which is used in an application for security check or the like. By reproducing the stereoscopic image, the movement of the operator can be figured out stereoscopically, for example, the operator, particularly the movement of a hand of the operator can be recognized also in the forward-backward direction. Therefore, more kinds of gestures are possible as compared to a reading technology using a two-dimensional image. In addition, even if a plurality of operators are extracted as images, in a case of many people, the forward and backward relation between the operators can be comprehended because of the stereoscopic image. Therefore, only the movement of the foremost operator can be extracted to be used for input of an operation.

CITATION LIST

Patent Literature

PTL 1: Japanese Patent Laid-Open No. 2004-078977

SUMMARY OF INVENTION

Technical Problem

However, in the conventional gesture operation, any standardized gesture such as a de facto standard is not established and a user can not intuitively recognize what can be done with what movement except for a pointing operation of XY ordinates by a forefinger. There are some cases where an instruction is made by fixing a click operation such as "click", "double clicks" or "drag" to the ordinate during a waiting time of a couple of seconds, but there are not a few cases where a comfortable operation is hampered by the event that the set waiting time is too long. Therefore, there is a problem that there does not exist a practical technique of making the operation such as "click" or "determination" (double clicks or the like) comprehensible and comfortable.

The conventional gesture detecting apparatus is different from an input apparatus such as a touch panel which an operator can touch directly and is difficult to figure out a clear intention of the operator. That is, even if the operator performs some movement, there occurs a problem that it is not easy to determine whether the movement expresses an intention of input or occurs simply as the result of the operator's habit. As a result, for example, there occurs a problem that a simple gesture can not be recognized unless it is performed in an unnaturally distinct manner, it is necessary to work out a prior arrangement of the gesture, or complicate gestures can not be used.

The present invention is made in view of the foregoing problem and an object of the present invention is to provide an image recognition apparatus and an operation determining method for enabling an accurate determination of an operation by performing a movement of an operator to the apparatus based upon the operator's recognition of a state where the operation relating to some input is being performed.

Solution to Problem

In order to achieve the above object, the invention is provided with an image recognition apparatus comprising three-dimensional photography means for taking an image of an operator to produce stereoscopic image data, operation screen forming means for forming a virtual operation screen based upon the image of the operator read by the three-dimensional photography means, operation determining means for, by reading a movement of an image of at least a part of the operator to the formed virtual operation screen by the three-dimensional photography means, determining whether or not the movement is an operation based upon a position relation between the part of the operator and the virtual operation screen, and signal output means for outputting a predetermined signal when it is determined that the movement is the operation.

The invention is characterized in that in an image recognition apparatus, in a case where the part of the operator is present closer to the three-dimensional photography means than the virtual operation screen, the operation determining means determines the part of the operator as the operation.

The invention is characterized in that in an image recognition apparatus, the operation determining means determines what operation is performed based upon a configuration or a movement of a portion closer to the three-dimensional photography means than the virtual operation screen, in the part of the operator.

The invention is characterized in that in an image recognition apparatus, the operation determining means retrieves storage means for storing an operation content in advance associated with the configuration or the movement of the part of the operator to determine the operation corresponding to the matched configuration or movement as an operation to be inputted.

The invention is characterized in that an image recognition apparatus, further comprises: image display means arranged facing the operator, wherein the operation determining means displays a determination result of the operation at a present point on the image display means such that the operator can recognize the determination result of the operation.

The invention is characterized in that an image recognition apparatus, further comprises: image display means arranged facing the operator, wherein when the movement of the operator is read within a region of a virtual operation layer, a mark in advance assigned in the virtual operation layer is displayed on the image display means.

The invention is characterized in that an image recognition apparatus comprises: image display means which can be visually recognized by the operator, wherein the image display means calculates a distance between the part of the operator at an opposite side of the three-dimensional photography means on a basis of the virtual operation screen formed by the operation screen forming means and the virtual operation screen from a position relation therebetween, and displays a mark changing with the distance to indicate an operation to be determined.

The invention is characterized in that in an image recognition apparatus, the image display means, when the part of the operator is closer to the three-dimensional photography means than the virtual operation screen, indicates the operation to be determined by stopping a change of the mark.

The invention is characterized in that an image recognition apparatus comprises: operation content determining means which, when the movement of the operator is read within a region of any of two or more virtual operation layers defined based upon the position relation to the virtual operation screen, determines a content of the operation based upon an operation kind in advance assigned to the virtual operation layer and the movement of the operator within the virtual operation layer.

The invention is characterized in that in an image recognition apparatus, the operation screen forming means forms the virtual operation screen in a position corresponding to position information of an upper body of the operator.

The invention is characterized in that in an image recognition apparatus, the operation screen forming means adjusts a position and an angle of the virtual operation screen based upon a position of the image display means.

The invention is provided with an operation determining method for determining an operation content by recognizing an image of an operator by an image recognition apparatus comprising: a three-dimensional photography step for taking an image of an operator to produce stereoscopic image data; an operation screen forming step for forming a virtual operation screen based upon the image of the operator read by three-dimensional photography means; an operation determining step for, by reading a movement of an image of at least a part of the operator to the formed virtual operation screen by the three-dimensional photography means, determining whether or not the movement is an operation based upon a position relation between the part of the operator and the virtual operation screen; and a signal output step for outputting a predetermined signal when it is determined that the movement is the operation.

The invention is provided with a program for executing an operation determining method for recognizing an image of an operator to determine an operation content by an image recognition apparatus, the operation determining method comprising: a three-dimensional photography step for taking an image of an operator to produce stereoscopic image data; an operation screen forming step for forming a virtual operation screen based upon the image of the operator read by the three-dimensional photography means; an operation determining step for, by reading a movement of an image of at least a part of the operator to the formed virtual operation screen by the three-dimensional photography means, determining whether or not the movement is an operation based upon a position relation between the part of the operator and the virtual operation screen; and a signal output step for outputting a predetermined signal when it is determined that the movement is the operation.

Advantageous Effects of Invention

The present invention comprises three-dimensional photography means for taking an image of an operator to produce stereoscopic image data, operation screen forming means for forming a virtual operation screen based upon the image of the operator read by the three-dimensional photography means, operation determining means for, by reading a movement of an image of at least a part of the operator to the formed virtual operation screen by the three-dimensional photography means, determining whether or not the movement is an operation based upon a position relation between the part of the operator and the virtual operation screen, and signal output means for outputting a predetermined signal when it is determined that the movement is the operation. Therefore, the operator does not need to learn particular gestures not familiar to the operation, and by moving an entirety or a part of the body, it is possible to determine the movement as an operation accurately expressing an intention of the operator.

BRIEF DESCRIPTION OF DRAWINGS

FIG. 8 is a diagram showing an example of setting an operation region of operation input support according to an embodiment in the present invention;

FIG. 9 is a diagram showing an example of adjusting an operation region by a position of a screen or a camera according to an embodiment in the present invention;

DESCRIPTION OF EMBODIMENTS

Hereinafter, embodiments in the present invention will be in detail explained with reference to the accompanying drawings.

First Embodiment

Figure 1:
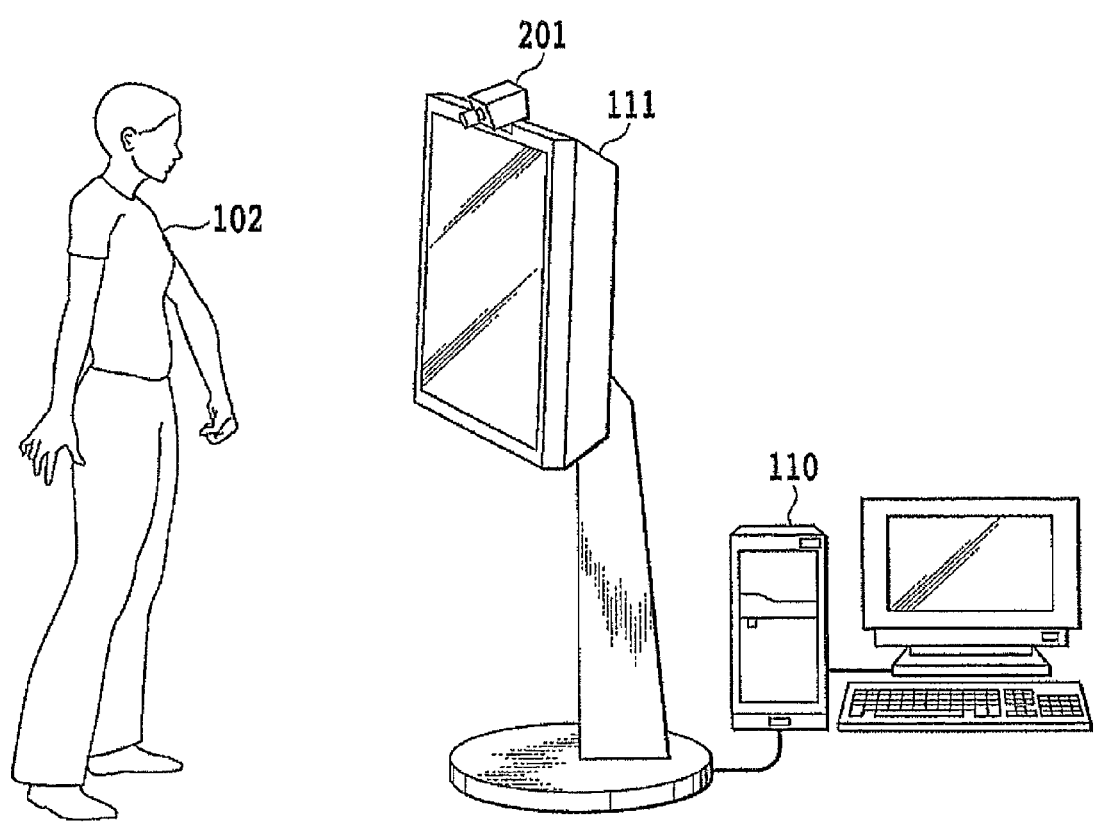
FIG. 1 is a diagram showing an example of an operation input system according to the present embodiment.

FIG. 1 is a diagram showing an example of an operation input system in the present embodiment. A monitor 111 in the present embodiment is arranged in front of an operator 102, and the operator 102 can estimate that a virtual operation screen exists in a constant position between the operator 102 and the monitor 111 to perform an operation to an operation input system in recognition of the event that a configuration of a finger or the like becomes a target of an operation determination. Various screen images for various applications at which the present system aims are displayed in the monitor 111, but in addition to it, as described later, it is possible to support the operation input. That is, for example, a portion of the operator 102 as the target, and the like are displayed in a corner of a screen to make the operator 102 recognize a movement which can be determined as an operation at the current point. The movement of the operator 102 is photographed by a video camera 201, the photographed screen image is processed by a computer 110, and positions and sizes of an optimal virtual operation screen and an operation region including the optimal virtual operation screen are set based upon a position, a height, and a length of an arm of the operator 102 or body dimension information of a height, a shoulder width and the like, thus determining what operation a gesture of a portion protruding in a side of the monitor 111 from the virtual operation screen means. That is, the computer 110 produces a stereoscopic image of the operator 102 and also calculates a position of the virtual operation screen from data obtained from the video camera 201, further adjusts the position and the size of the virtual operation screen from positions and arrangement states of the video camera 201 and the monitor 111 to be described later, and determines whether or not hands and fingers of the operator 102 protrude into the side of the video camera 201 based upon the virtual operation screen, determining an operation content by estimating the protruding portion as a target of the operation.

In FIG. 1, for obtaining an image, the video camera 201 is attached to an upper part of the monitor 111 to produce the photography, but if a necessary image is obtained as shown in FIG. 8 to FIG. 12, the photography means is not limited thereto, and any photography means known in the present technological field, such as an infrared ray camera may be used, and any place near the monitor may be selected as the installation site. Here, in the present embodiment, the stereoscopic image including the operator can be produced by using a three dimensional (3D) camera as the video camera 201.

Further, an audio output apparatus such as a speaker (not shown) is attached in the system of the present embodiment, and information on the display content and the operation can be conveyed to the operator by audio. By providing such a function, since the virtual operation screen is comprehended by not only displaying the operation content on the display device by the image but also simultaneously providing the instruction matter and result by audio, even an operator with visual disability can perform the operation.

Figure 5:
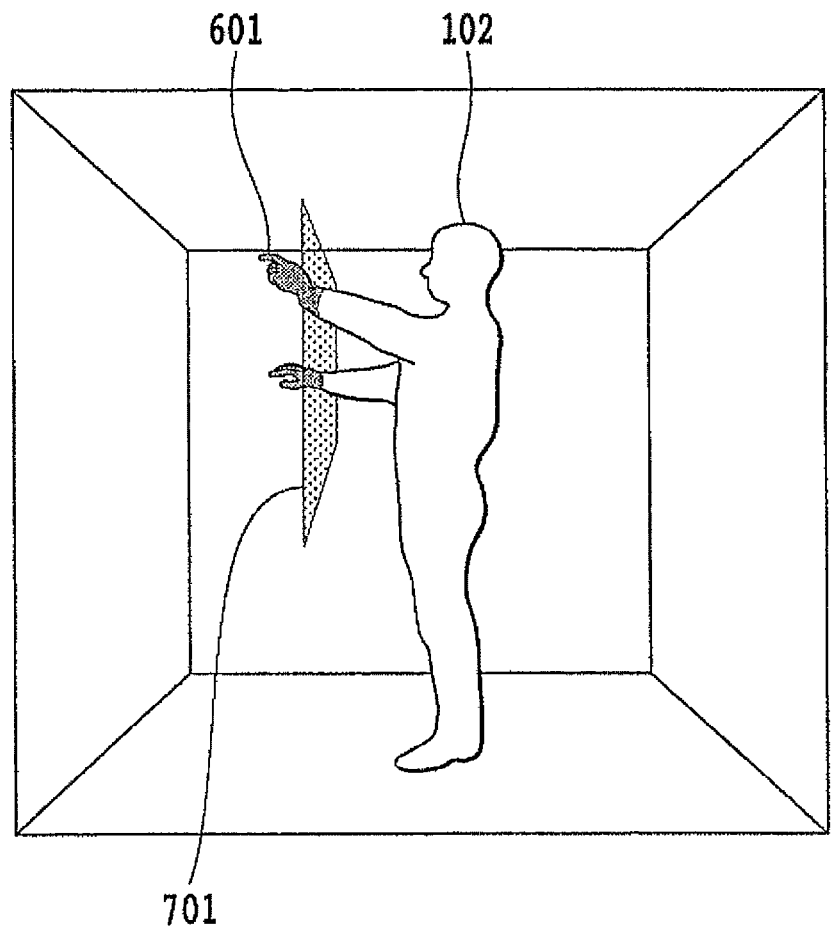
FIG. 5 is a diagram showing a state of a virtual operation screen formed by an operation screen forming reference according to an embodiment in the present invention.
Figure 6:
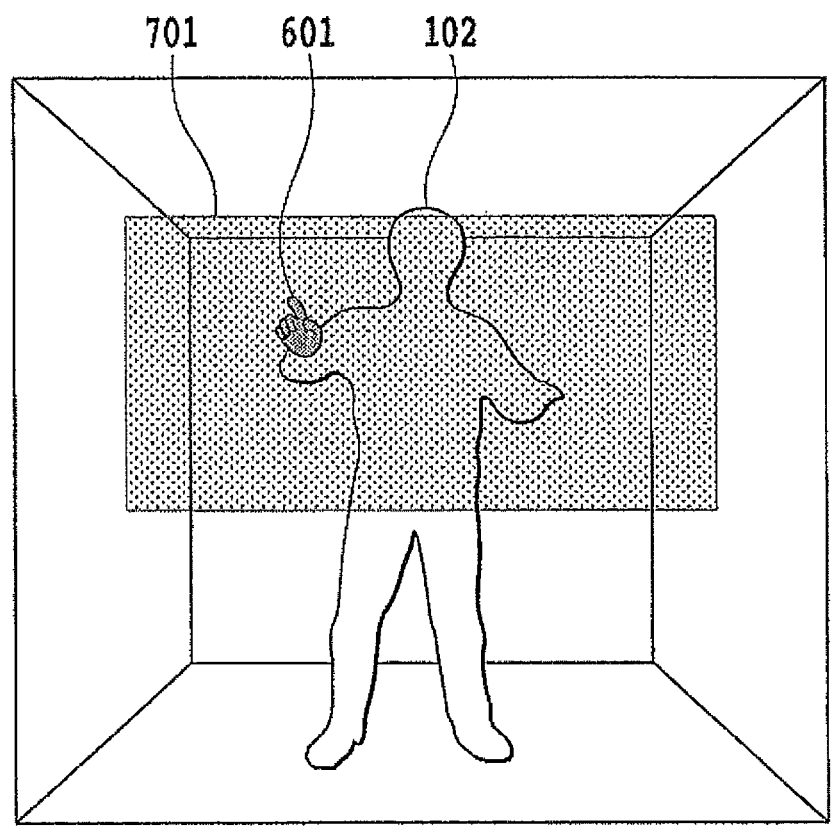
FIG. 6 is a diagram showing a state of a virtual operation screen formed by an operation screen forming reference according to an embodiment in the present invention.

FIG. 5 and FIG. 6 are diagrams each explaining a special role of the virtual operation screen. A virtual operation screen 701 in the present embodiment is set based upon a length of a height or an arm or body dimension information of a height, a shoulder or the like of the operator 102. In a case where the operator 102 assumes that the operation screen 701 exists virtually in a place where the operator 102 naturally extends his arm and has an attempt of performing various operations, the operator 102 can show a gesture by extending a hand 601 forward on a basis of the operation screen 701. In addition, the operation screen 701 can be used as a determination reference of the movement, for example, after a user in an operation region including the virtual operation screen takes any pose, an action can be determined by a pushing-out (determination) movement forward of the virtual operation screen or the pushing-out is made after determination of the operation. Therefore, a user tends to easily recognize the operation screen and the operability is nearly the same as in the conventional touch panel. On the other hand, the operation variations increase overwhelmingly as compared to the conventional touch panel (operations by both hands, a behavior, plural fingers, and the like).

In the present embodiment, the virtual operation screen 701 as shown in FIG. 5 and FIG. 6 is adapted to be formed in real time when the camera 201 captures an image of the operator 102, but since a standing position of the operator is not constant until the operator starts to perform the operation, the virtual operation screen is not defined and the operation determination is also not easy to make. Therefore, in the present embodiment, the setting process of the virtual operation screen may start at timing when the body of the operator has stopped for a given time within a photography range of the three-dimensional camera.

In this manner, the formation of the virtual operation screen in the present embodiment can be made in real time, but also in this case, the operation determination can be more accurately made by limiting the standing position of the operator within a constant range optimal for the system by any method. For example, although not shown, the operator can be guided in movement by drawing footprints showing a standing position of the operator on a floor surface, by making the operator recognize existence of a constant limit range by an arrangement of the monitor or the system, or by placing a screen, thus performing the operation within a constant range. A position or a size of the virtual operation screen which the operator can naturally recognize depends greatly on a position relation between the operator and the monitor, and it is preferable that positions of the monitor, the camera and the operator, and the like are in advance estimated in the entire system. Therefore, by thus limiting the standing position, the operator can perform the operation by generally estimating a position where the virtual operation screen exists.

Figure 7:
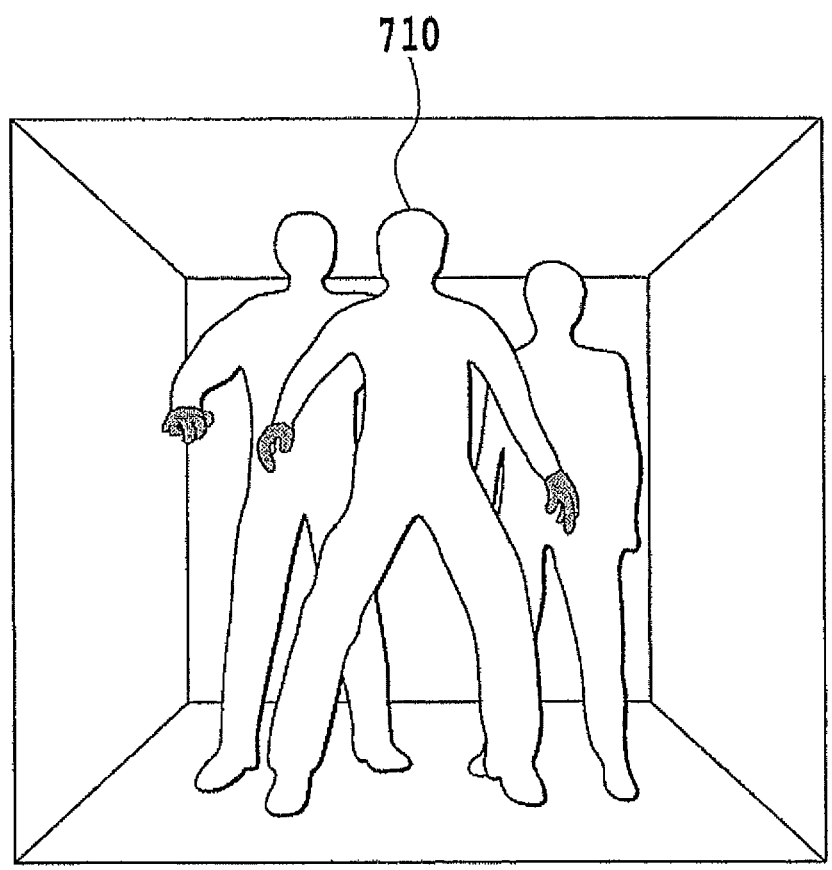
FIG. 7 is a diagram showing an example of an image in a case of taking in an image of a plurality of operators using the conventional three-dimensional camera.

In addition, as shown in FIG. 7, in a case where a plurality of operation target persons exist, that is, a plurality of persons are photographed by the camera 201, for example, a person 701 who is present in the foremost row among them is specified as the operator 102 to form a virtual operation screen. Without mentioning, who will be selected as the operator 102 can be variously determined corresponding to a system, but an erroneous operation or input can be prevented by not providing an operation region to a person other than a priority user at the foremost position (in a case of single input).

Figure 2:
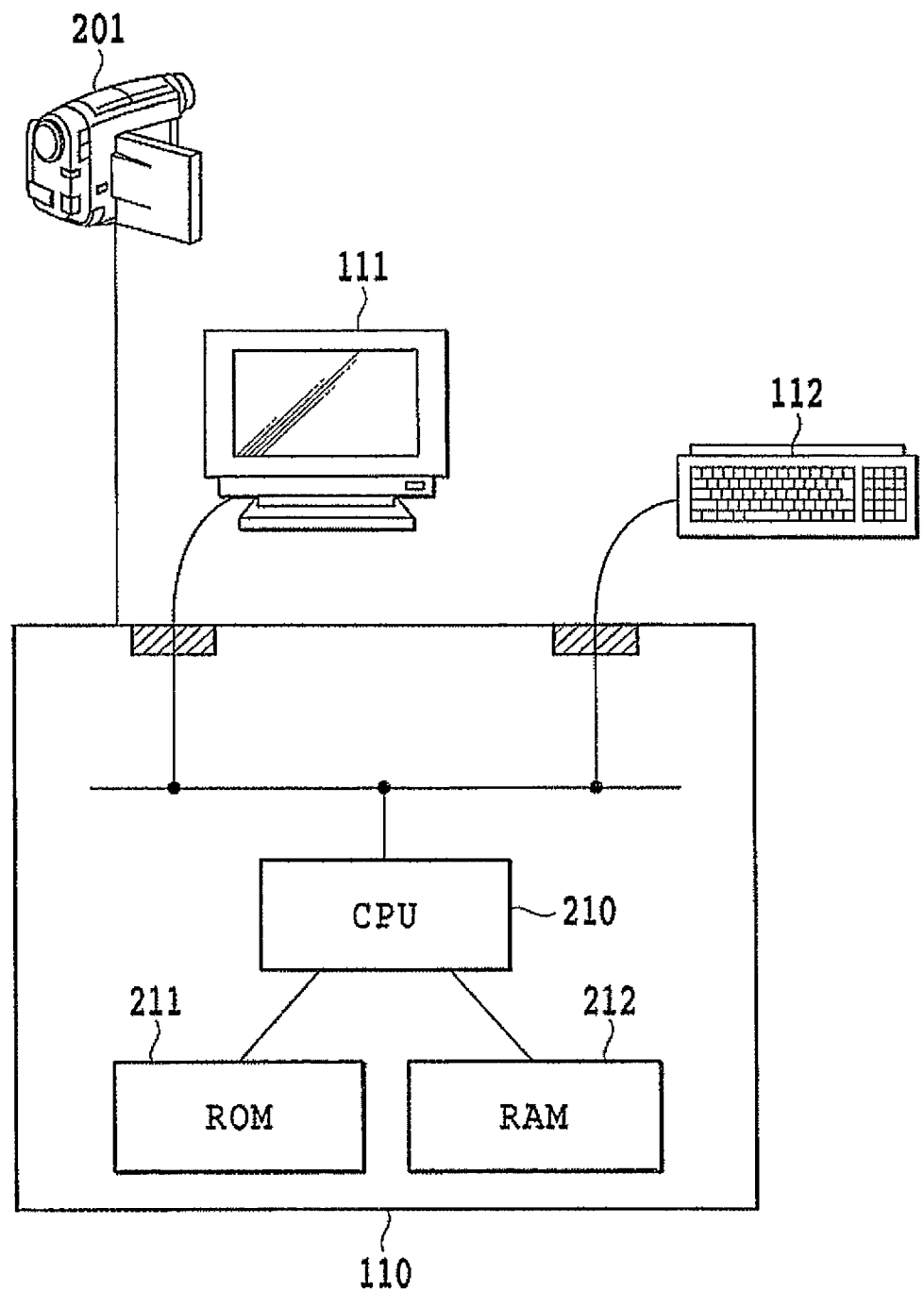
FIG. 2 is a block diagram schematically showing a relation between the operation input system and a computer according to the present embodiment.

FIG. 2 is a block diagram schematically showing the structure of the computer 110 in the image recognition apparatus of the present embodiment. The video camera 201 attached to the monitor 111 for photographing the operator 102 and the like is connected to the computer 110, and the photographed image is taken in the computer 110. In regard to the image obtained by the photographing, extraction, calculation of a position, and the like of the image as the feature in the present embodiment are carried out in the CPU 210, and it is determined whether or not a part of the body extends to a side of the video camera out of the operation screen, based upon the calculated position. The computer 110 is generally provided with the CPU 210, which executes programs stored in a ROM 211 or the like on a RAM 212 to output the process result based upon the image inputted from the image recognition apparatus to the monitor 111 or the like. In the present embodiment, the monitor 111 mainly serves to output various screen images provided from various applications which the operator tries to experience, but also displays the information which will become support of the operation input to be described later.

Figure 3:
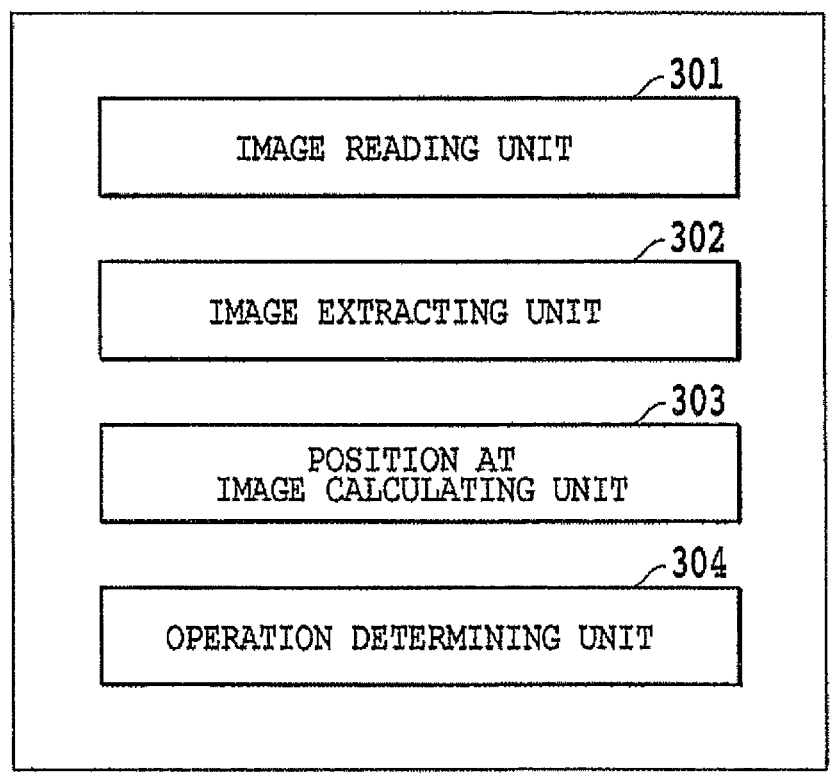
FIG. 3 is a block diagram showing an example of a function module of a program processed in a CPU of the computer according to the present embodiment.

FIG. 3 is a block diagram showing an example of functional modules of the program to be processed in the CPU 210 of the computer 110 in the present embodiment. As shown in FIG. 3, the processes in the present system are executed by an image reading unit 301, an image extracting unit 302, and a position at an image calculating unit 303, and an operation determining unit 304. It should be noted that in the present embodiment, the process of receiving an image from the video camera 201 to the process of performing output of the data are executed by four modules, but, not limited thereto, may be executed by use of other modules or by the less number of the modules.

Process of the Present Embodiment

In the present embodiment, as shown in FIG. 6, the virtual operation screen is created based upon the image of the operator 102 photographed by the video camera 201, positions of hands or fingers as a part of the operator 102 likewise photographed are defined, and also the process of calculating a position relation between the virtual operation screen 701 and a hand-finger 601 of the operator 102 is executed. In the present embodiment, when initial settings known in the present technological field are assumed as a pre-condition for executing such a process, for example, assuming a case where the image recognition apparatus in the present embodiment is newly installed, it is necessary to input information such as a distortion of use lens of the video camera 201 to be used, and a distance between the monitor 111 and the lens, as the preliminary preparation. Further, a threshold value and the like are in advance adjusted. When the initial settings in the system are competed, the process in the present embodiment is supposed to be executed, which will be hereinafter explained with reference to FIG. 4.

Figure 4:
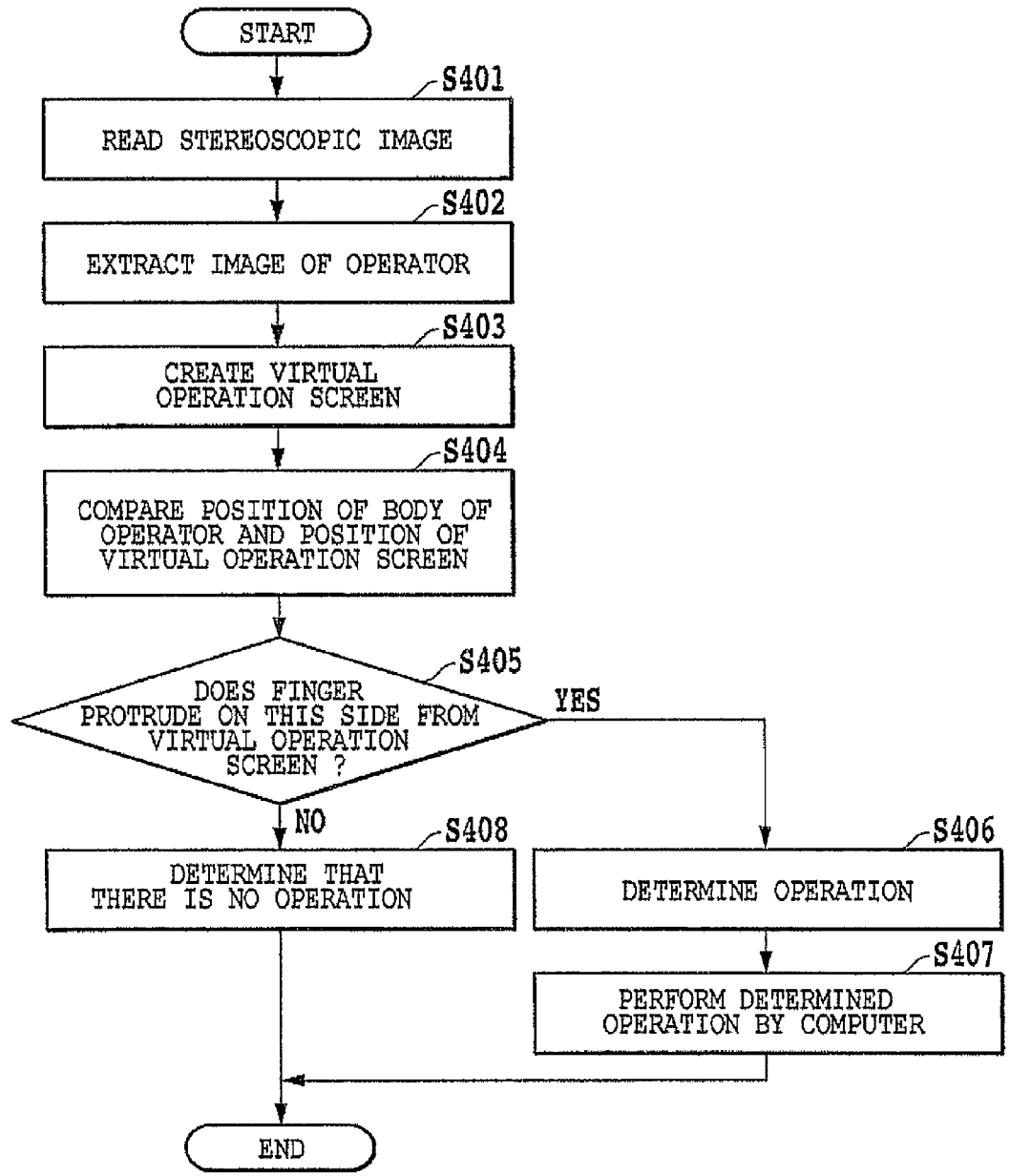
FIG. 4 is a flow chart of the process according to the present embodiment.

FIG. 4 is a flow chart of the process in the present embodiment. First, the image reading unit 301 reads the data photographed by the video camera 201 (S401), and the image extracting unit 302 extracts the image of the operator from the data (S402).

AS a result of this preparation, the virtual operation screen and the operation region are determined based upon the extracted image of the operator 102 (S403). Here, a configuration of the operation screen is created as a rectangular shape rising perpendicularly from the floor surface by referring to FIG. 8 and the like, but is not limited thereto, and the operation screen may be created to have various configurations and sizes depending on an operation mode of the operator.

Here, the operation region is a region including the virtual operation screen as the feature in the present embodiment and is a region where hands and fingers as a main body of the operation in the operator are primarily moved. As will be explained in the support to the virtual operation screen to be described later, a given region from the body of the operator to a region exceeding the virtual operation screen is used for operation recognition of the present invention. For example, in regard to an adult operator 810 as shown in FIG. 8, the operation region can be formed as an operation region 811 in consideration of a height (view position) and a length of the arm. In a case of a child operator 820, since the height is lower and the arm is shorter, an operation region 821 can be set in accordance with it. If the virtual operation screen is set within this operation region, when the operator naturally moves his hands and fingers, the operation which the operator intends to perform can be determined based upon the movement of the hand or the finger.

More specially, for example, a range of the depth can be made to a fingertip when the operator extends his hand forward, a range of the horizontal width can be made to a length between the right and left wrists when the operator extends his hands right horizontally, and a range of the height can be made from a position of a head of the operator to a position of a waist thereof. In addition, in a case where target persons of the system in the present embodiment are assumed as from low graders in an elementary school to adults, a width of the height is in the order of about 100 cm to about 195 cm and a correction width between the upper and lower positions of the operation region or the virtual operation screen requires about 100 cm as the height difference.

It should be noted that the virtual operation screen and the operation region may be created at each time or may be created under a given condition, or these setting timings may be selected in advance or at each time.

The operation determining unit 304 uses a relative relation between the virtual operation screen created in the operation input system and the operator 102 (S404) to determine that the operation has started when a part of the operator 102 comes on this side of the operation screen as viewed from the video camera 201 (S405), and determines to which operation in advance estimated a configuration or a movement of each portion corresponds, from the configuration or the movement of each portion (the hand is open, two fingers are raised or the like) (S406). Here, a determination on which configuration or movement corresponds to which operation can be made by the system independently or can be made by taking any of methods known in the present technological field. The determined result is executed by the computer 110 assuming that such input is made (S407), and in a case where the hand does not extend to this side from the virtual operation screen, it is determined that the operation is not performed, and the process ends (S408). The determination of the operation content is not limited to the process explained herein, but any of methods known in the present embodiment can be used. In addition, the special determination method is also omitted, but in general, the configuration and the movement of the body of the operator such as gestures in advance defined and the operation contents which these mean are stored in a data base or the like, and after the image extraction, access to the data base is made to determine the operation content. In this case also, the determination accuracy can be improved by using the image recognition technology or artificial intelligence based upon the method known in the present technological field.

Here, it is understood that the position and the size in which the virtual operation screen is created change depending on a case where the operator is a child or an adult. Further, it is necessary to adjust the virtual operation screen depending on a position or a mounting angle of the camera 201 or the monitor 111 in addition to a difference of the body shape such as a height of the operator. The three-dimensional camera can usually perform a distance measurement to a target object in parallel to or in a concentric shape with a CCD or a lens face. In a case where the monitor is installed in a height of eyes of the operator, the camera is in a close position, and each of them is installed perpendicularly to the floor surface, if the operator is in a standing position, it can be said that there is no necessity of particularly adjusting or correcting the position relation of each other and the like for producing an appropriate operation region. However, in a case of using a ceiling hanging type monitor or a super jumbo type monitor or projector, the camera installing position or the position relation between the monitor and the operator is estimated to be in various situations.

In general, since an operator performs an input operation while viewing an operation target screen, unless the virtual operation screen is always arranged perpendicularly to a straight line connecting a sight line of the operator and the operation target screen to produce an operation region along the virtual operation screen, an angle of a pushing stroke of the operator in the z direction causes non-agreement. Therefore, even if the operator performs a pushing operation to a point targeted, the pushing operation shifts along any of the stroke angles following the pushing operation, resulting in that a normal operation cannot be performed. Therefore, in a case of creating the virtual operation screen, it is required to adjust an angle, a size or a position in some cases to be created in accordance with positions and arrangement states of the monitor, the camera and the operator.

By referring to FIG. 9, the operation region 821 and the virtual operation screen 601 are defined to match the operator 820 as shown in FIG. 8, but in a case where the camera 201 is arranged in the lower part of the monitor 111 as in the case of an example shown in FIG. 9, unless the virtual operation screen 601 is perpendicular to a direction 910 where the operator 820 extends his arm, the operator 820 can not obtain a good operation feeling to the virtual operation screen. Therefore, the virtual operation screen 601 is not a plane perpendicular to a sight line direction of the camera 201.

Figure 10:
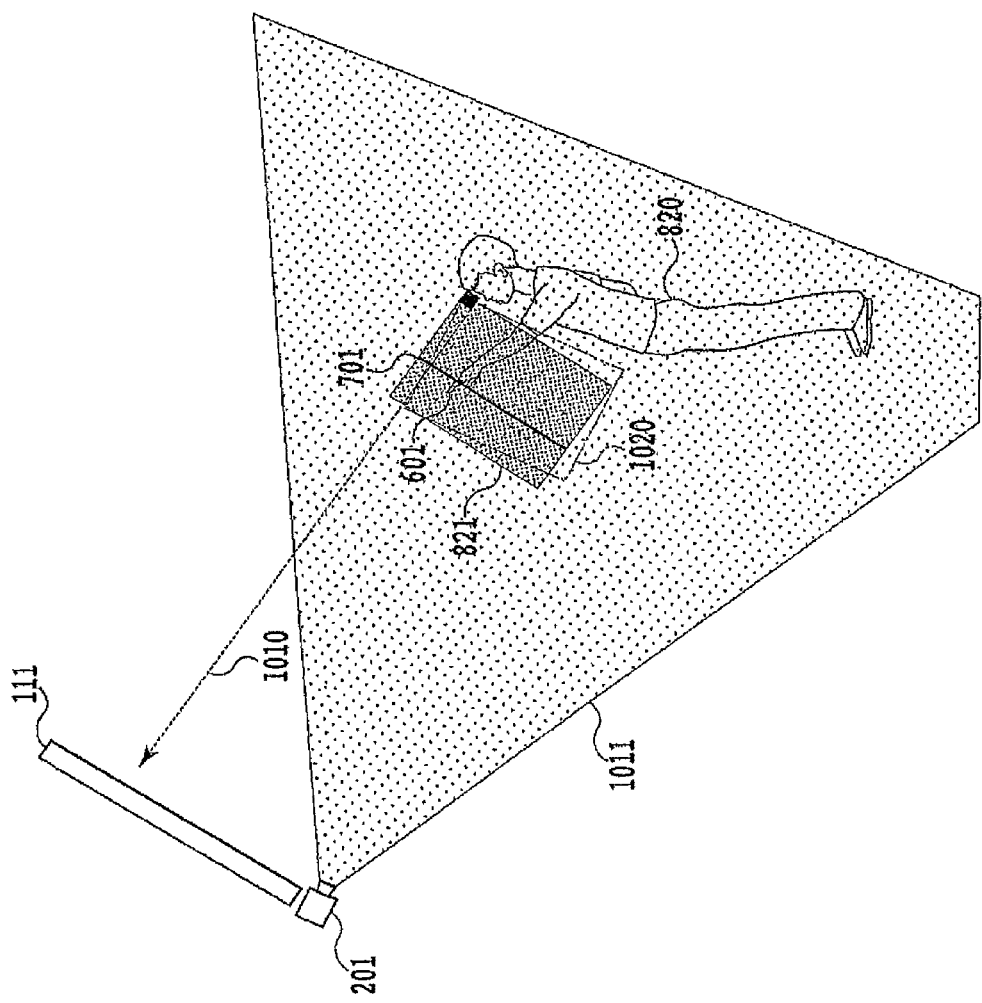
FIG. 10 is a diagram showing a different example of adjusting an operation region by a position of a screen or a camera according to an embodiment in the present invention.

In addition, by referring to FIG. 10, since the monitor 111 itself is installed upward and is attached at some degrees, the virtual operation screen 701 becomes a plane perpendicular to a direction 1010 having an upward inclination such that the operator 820 can perform an operation while looking up at the monitor 111. In this case also, since a viewing field 1011 of the camera 201 is inclined at a constant angle to the sight line direction 1010 as similar to the example shown in FIG. 9, it is necessary to correct the information took by the camera 201 to match the inclined virtual operation screen 701. Further, by referring to FIG. 11, the camera 201 is disposed away from the monitor 111 and near the floor, and a larger angle is formed between the sight line 1010 of the operator 820 and the viewing filed of the camera 201. Therefore, it is required to make the correction corresponding to that angle.

Figure 12:
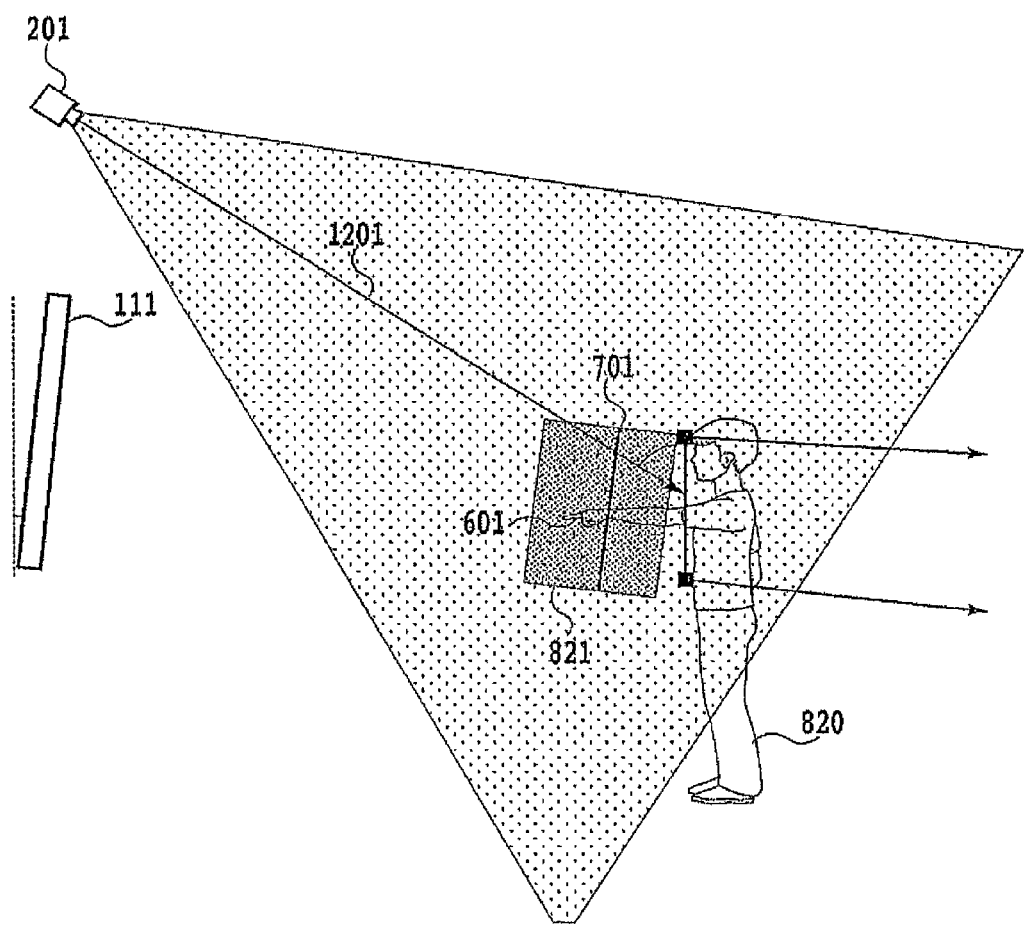
FIG. 12 is a diagram explaining a method for adjusting an operation region by a position of a screen or a camera according to an embodiment in the present invention.
Figure 13:
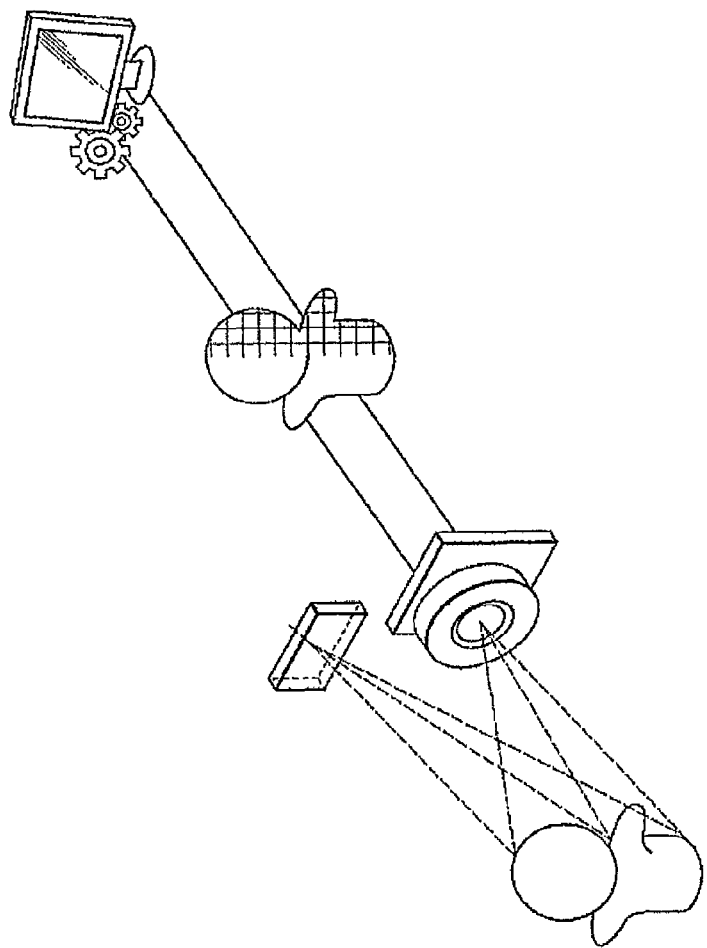
FIG. 13 is a diagram showing a method for taking in an image of an operator using the conventional three-dimensional camera.

FIG. 12 is a diagram for explaining an example of defining the virtual operation screen 701 and the operation region 821. In the present embodiment, for determining the virtual operation screen, information of positions and arrangement methods (for example, at which angle it is installed) of the monitor 111 and the camera 201, a standing position and a height of the operator 820, and the like is used. That is, as an example, first, the virtual operation screen 701 perpendicular to a sight line of the operator is calculated from a height of eyes (body height) of the operator 820 to the monitor 111 and from a standing position of the operator 820. Next, an angle between line A-B connecting a head and a body of the operator 820 and a center line 1201 of the viewing filed of the camera 201 is measured to correct each inclination of the virtual operation screen and the operation region. A stroke of the arm may be extracted from an image of the operator or may be separately defined based upon the information of the obtained height from information of an average length of the arm for each height. Alternatively by using a marker or the like similar to an operation screen creating reference in the second embodiment to be described later, a position, a size and an angle of the virtual operation screen can be set. For example, in a stage of installing the system, a platform, a guide bar or the like to which the marker is attached is placed in an optimal position to be photographed by a camera, and the virtual operation screen is set based upon the position of the photographed marker. For an actual use thereof, the platform or the guide bar first placed is removed, and the virtual operation screen and the operation region can be created to be corrected by a body shape of the operator or the like.

The virtual operation screen and the operation region in the present embodiment are, as described above, defined based upon the positions and the arrangement states of the camera, the monitor and the operator in such a manner as to enable the natural operation and the easier operation determination, and an actual movement of the operator is detected to make a determination on which operation is performed. However, the processes necessary for putting the present embodiment into practice, that is, special processes not explained herein, for example, the process on how the position or the configuration is specified from the image of the three-dimensional camera or the determination process on whether or not a part of the operator passes through the virtual operation screen can be achieved also by using any of methods known in the present technological field.

(Support of Operation Input)

As explained above, simply by creating the virtual operation screen with the three-dimensional video camera, the operator can recognize the operation screen such as a touch panel on a space, and performs various operations to the operation screen, thus making it possible to perform the operation input by using the entirety or a part of the body. Further, by supporting the operation input such as displaying the screen image of the operator to the virtual operation screen on the monitor 111, the system in the present embodiment can be more easily used.

Figure 17:
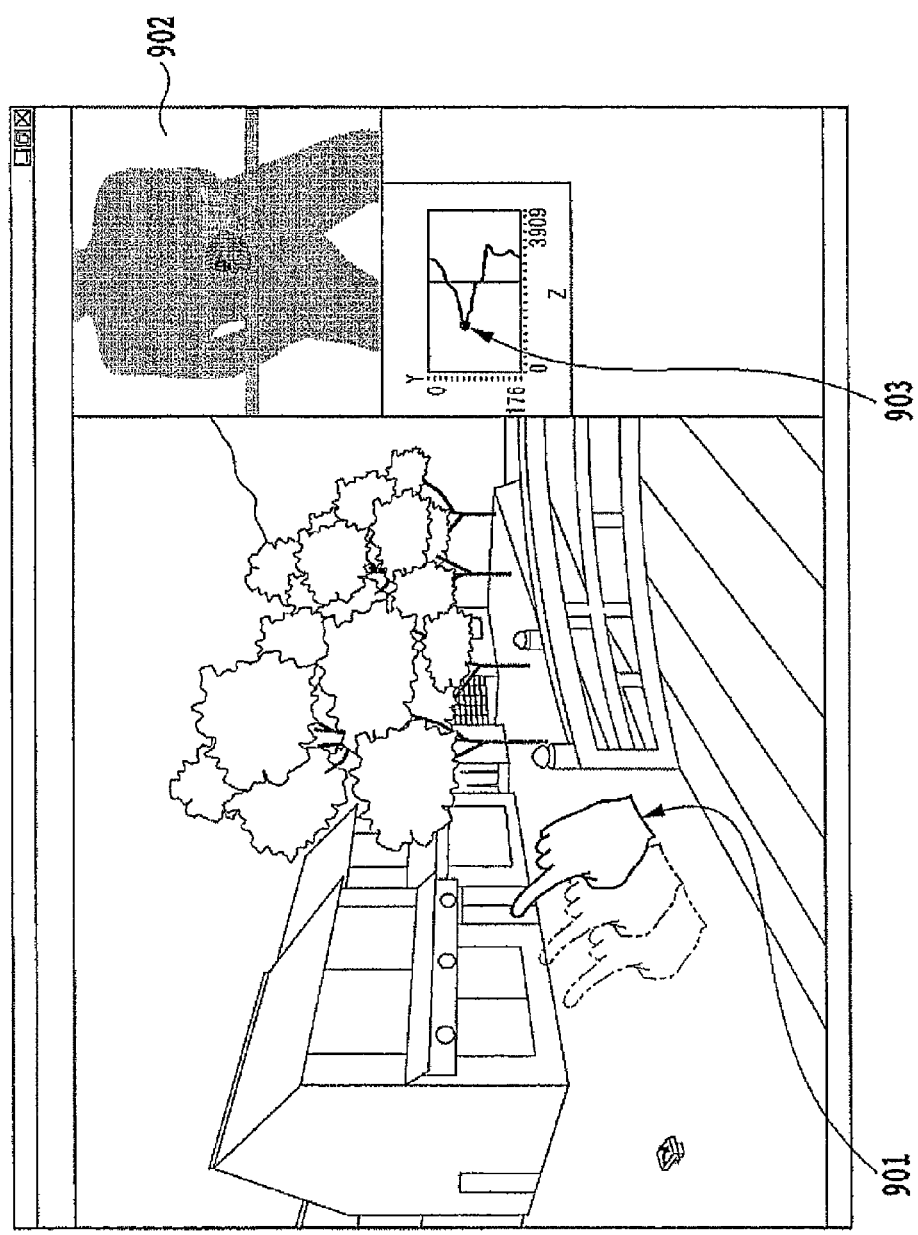
FIG. 17 is a diagram showing an example of a special display of operation input support according to an embodiment in the present invention.

FIG. 17 is a diagram showing an example of displaying guidance as the support of such operation input on the monitor 111. For example, in a case of pointing out somewhere of an image displayed in the center portion of the monitor 111 by a pointer, an operator combines the virtual operation screen and the displayed image to be overlapped and extends a hand-finger of him toward it, thereby making it possible to point a desired spot, but by displaying the state of such pointing as a pointer 901 shown in FIG. 17, the operator can perform the next operation while recognizing and confirming the operation having been currently performed. According to this example, for example, the pointer 901 is adapted to be displayed on a screen at the time the hand-finger protrudes from the operation screen and disappear at the time it pulls in from the operation screen or be displayed in shade and light coloring. Therefore, the operator can execute the input method of the present embodiment in a natural manner from the movement of the hand and the state of the pointer displayed on the monitor 111. Likewise, by displaying an operation screen 902 having expressed the state of the operator himself in the form as shown in FIG. 5 and FIG. 6 on the top right corner of the monitor 111 in a small size, how the operator behaves at present and the movement is determined as what kind of the operation in the system can be displayed. In addition, a polygonal graph 903 having graphed the movement of a hand is shown to make the operator himself be conscious of the forward and backward movements of the hand, thereby expecting a more accurate operation. Further, although not shown, the support can be made in such a manner that gestures usable in the system are displayed to the guidance to prompt the operator to perform the operation input according to the display.

(Operation Support on this Side of Virtual Operation Screen)

The present embodiment is designed such that an operator performs an operation on a basis of a virtual operation screen created virtually on a space as if an input device such as a touch panel existed therein, thus certainly determining the operation content. However, the operation support is made until a hand or a finger as a part of the operator reaches the virtual operation screen, that is, for a period from a point where the operator starts to move a hand or a finger for execution of some operation to a point where the operator presses down the virtual operation screen, and thereby, the operation input can be performed more easily and more accurately.

Basically this principle of the operation support is designed such that by visually displaying on the monitor 111 what kind of operation the operator will perform in response to the movement of the position in a portion of the operator, for example, a hand or a finger, the operator is guided to enable the accurate operation input.

Figure 18:
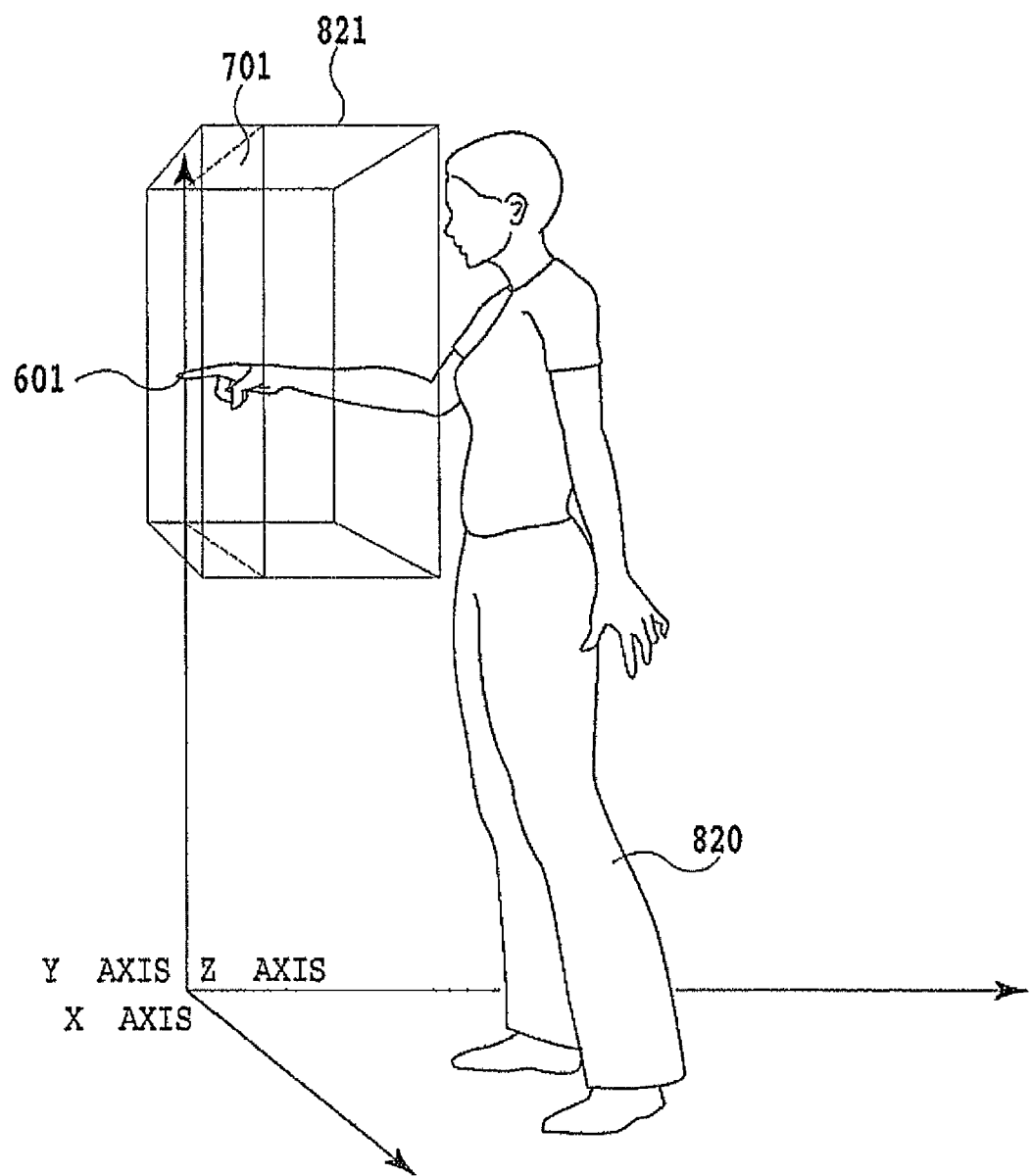
FIG. 18 is a diagram showing a state of a virtual operation screen and an operation region according to an embodiment in the present invention.
Figure 19:
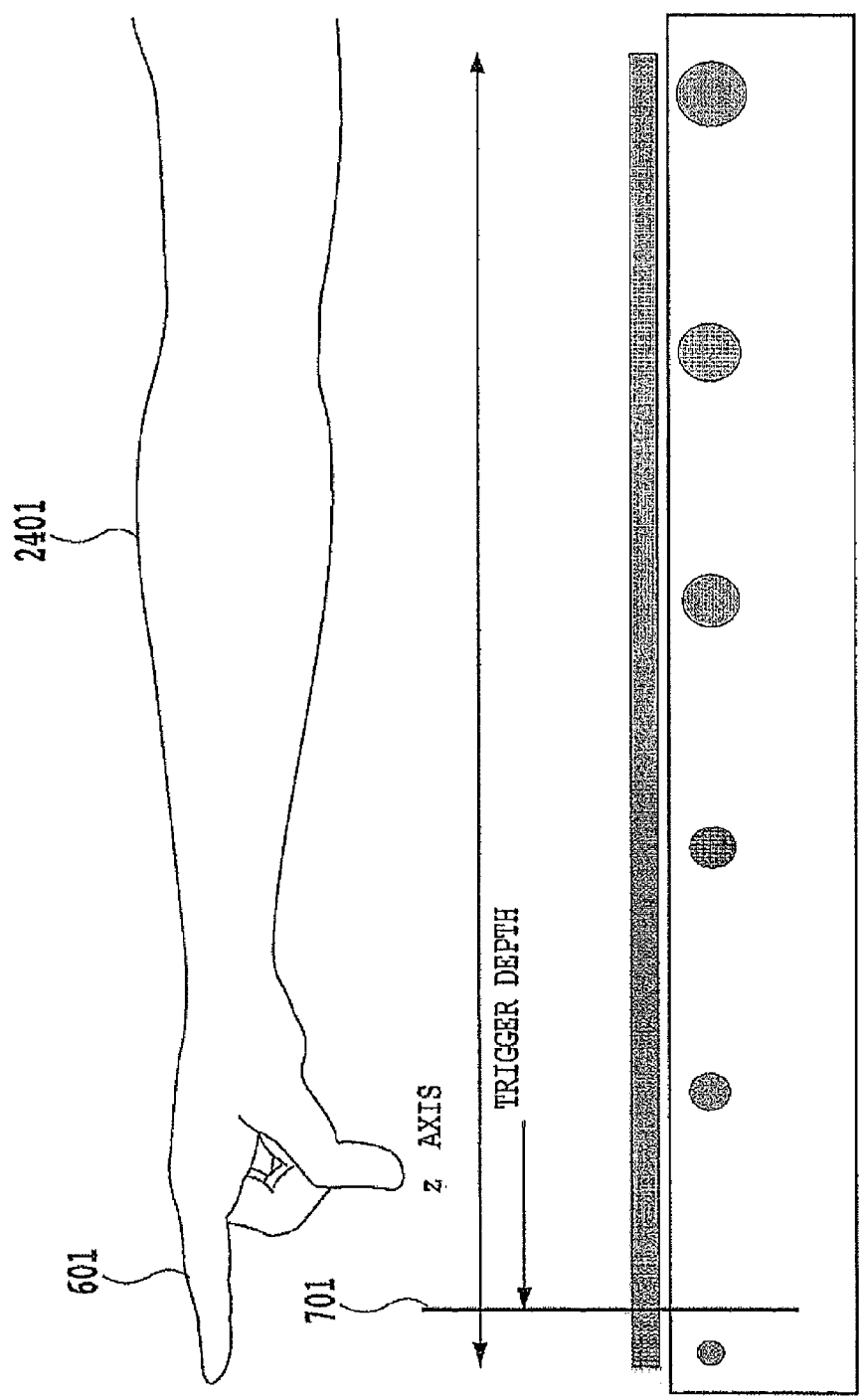
FIG. 19 is a diagram showing a relation between a movement of an operator and an icon displayed on a screen according to an embodiment in the present invention.

When this respect is explained with reference to FIG. 18 and FIG. 19, in the present embodiment, in a case where the operator can in advance perform an operation in a constant standing position, the virtual operation screen 701 is displayed in a position suitable for the operation to the virtual operation screen at the standing position in advance set or in an appropriate position as needed to match the standing position of the operator. Likewise, as shown in FIG. 18, an operation region 821 suitable for the operator 820 is in advance set. As described above, what kind of operation will be currently performed is shown in various forms on the monitor 111, and thereby, the operator can recognize his own operation.

When one of these forms is explained with reference to FIG. 19, in a case where an operator performs some operation to the system, a position of a hand or a finger 601 changes by moving an arm 2401 forward and backward to the monitor 111 in the present example. Therefore, when the changing state is displayed in the monitor 111, as the protruding finger 601 reaches a constant position, a constant process as the system is executed at this time, for example, the item instructed on a screen of the monitor 111 is executed. In the example in FIG. 19, a size of the icon changes depending on a position (depth) of the finger 601 to the virtual operation screen 701, and as the finger 601 approaches the virtual operation screen, the icon becomes the smaller, and therefore, the operator can recognize that the finger is focused on a constant spot by his own operation. In a position where the icon is changed to the smallest, the operation is fixed and the process corresponding to it is executed.

Figure 20:
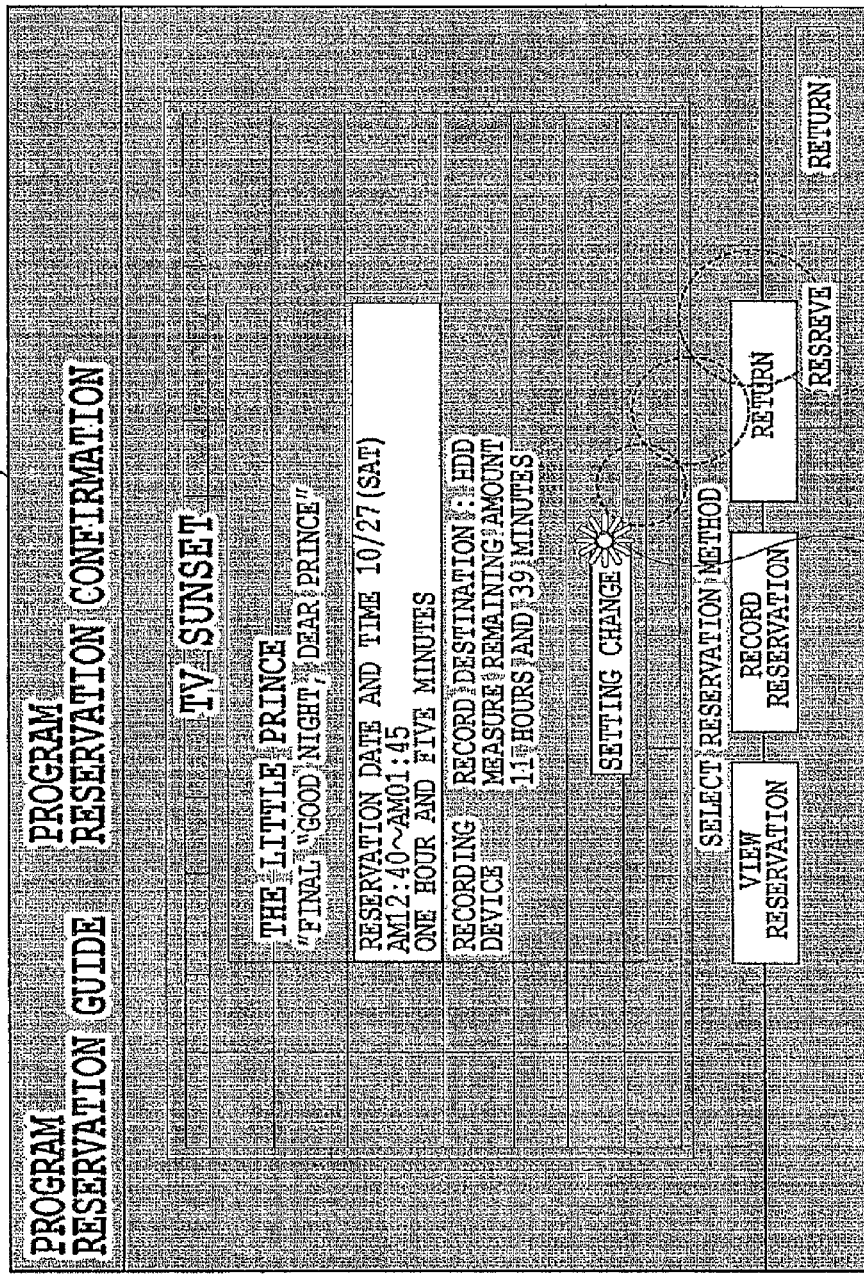
FIG. 20 is a diagram showing an example of a special display of an operation input screen according to an embodiment in the present invention.

As a result of the above operation, FIG. 20 shows how the icon changes on a screen 2501 of the monitor 111. By referring to FIG. 20, for example, a television program table is displayed on the screen 2501 of the monitor 111, wherein an operation in regard to some program is going to be performed. In this state, for example, when an operator selects a menu button of "Setting Change", the operator extends the finger 601 toward the monitor 111 as described above to select the menu button. In the present embodiment, when the finger 601 approaches the virtual operation screen by a given distance, an icon 2503 is displayed on the screen 2501. In regard to icons, since the position of the finger is still at a distance, a relative large icon in the right side among the icons shown in FIG. 19 is displayed. When the operator further extends his arm 2401, this icon approaches "Setting Change" of a selection item as a target to be smaller, and becomes a particular icon in a case of an icon 2502 having a constant size. When the finger crosses the virtual operation screen, it is determined that the item of the pointed position is selected.

In this manner, in the example in FIG. 20, by changing the size of the icon displayed on the screen 2501 according to the position of the finger 601, the operator can comprehend how his own movement is recognize in the system and intuitively recognize the position of the virtual operation screen to perform the operation such as selection of the menu. Here, the positions and the sizes of the entire operator including the finger 601 and the arm 2401 and each portion can be extracted by using the three-dimensional camera in the same way with the entire image of the operator. In consequence, since the object within the screen can be figured out including the depth, it is possible to calculate the distance and the position relation to the virtual operation screen based upon these pieces of information. However, in regard to the three-dimensional camera used in the present embodiment, the extraction of the position, the calculation of the distance and the like, any of methods known in the present technological field can be used, and therefore, the explanation is herein omitted.

Figure 21:
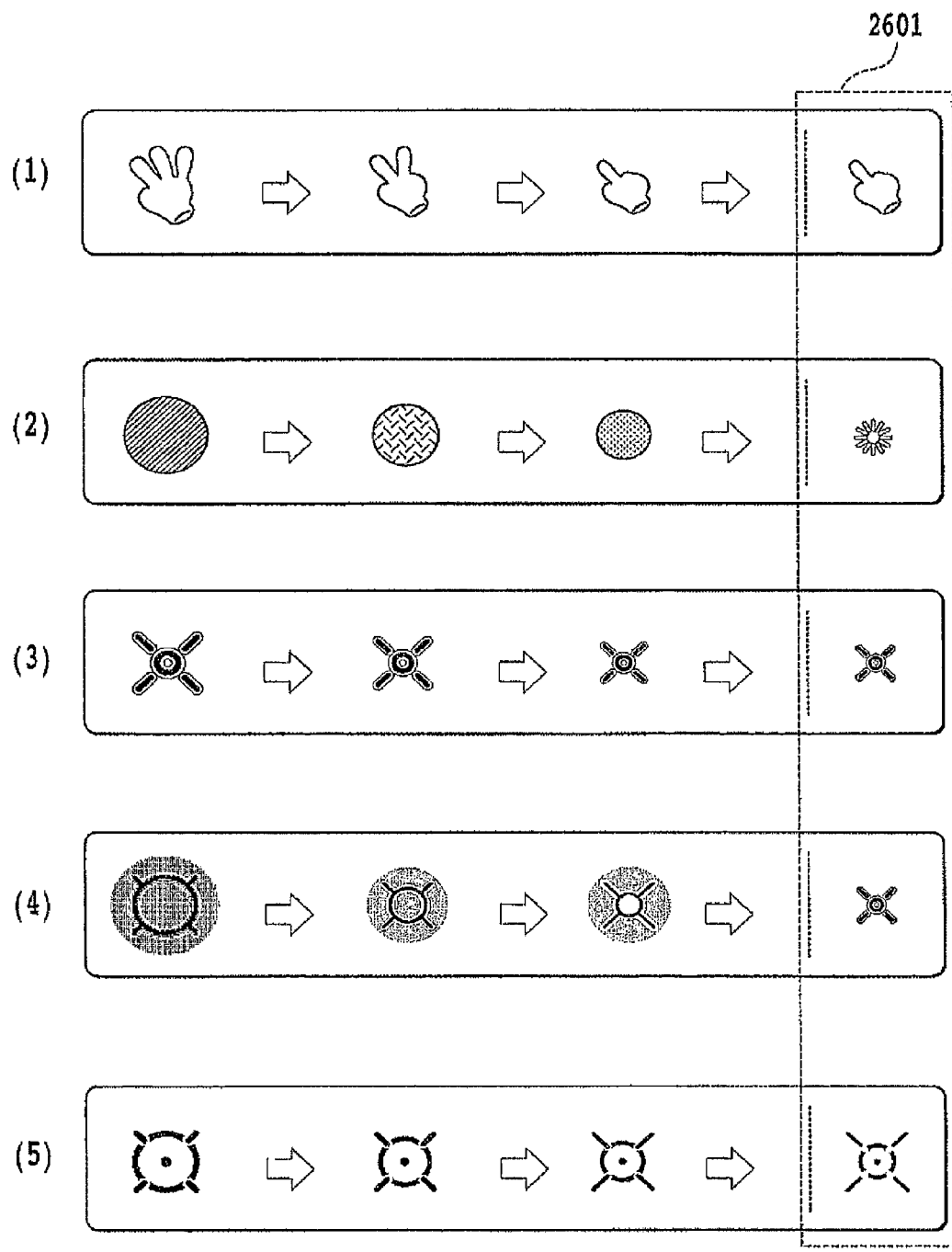
FIG. 21 is a diagram showing an example of various icons usable in an operation input screen according to an embodiment in the present invention.

The icon displayed on the screen herein is formed in a circular shape and changes in size in accordance with the movement of the operator, but, not limited thereto, icons having various forms as shown in FIG. 21 can be used for various changes. That is, by referring to FIG. 21, Example (1) shows icons each regarding a form of a finger, wherein the icon is smaller as the finger approaches the virtual operation screen in the same way as in the example in FIG. 20. Example (2) shows that an icon is created in a circular shape and is gradually smaller, but when the input or selection is fixed, the icon changes into a particular configuration to indicate the fixation. In a case of this icon or other icons, a color of the icon can be changed instead of the change of the configuration and size or in agreement therewith. For example, the operator can intuitively recognize that the operation is focused and fixed by changing the color from a cold color group to a warm color group, such as in the order of blue, green, yellow, and red. Example (3) shows that an icon is created in an X shape, wherein in a case where the icon is at a distance, the icon is not only large but also is shown with gradation, and as the icon is nearer, a size of the icon is smaller and is created in a sharp shape with the gradation disappearing. Example (4) shows that there is recognized a state where an entire icon does not change in size, and a figure drawn inside it changes in configuration to be focused. In this case, a color of the figure can be also changed. Example (5) shown in FIG. 21 also shows an example of changing a configuration of an icon. In FIG. 21, a configuration and a color of the icon change in response to the movement of the finger, and by changing it into various configurations or colors or repeatedly turning on and off the icon as shown in column 2601 in a moment when the finger extends over the virtual operation screen, the operator may recognize that the movement is determined as the operation. In addition, although not shown, in regard to other changes of the icon, a change that at first, the icon is transparent, and becomes less transparent as the finger is closer to the virtual operation screen is also effective.

Figure 22:
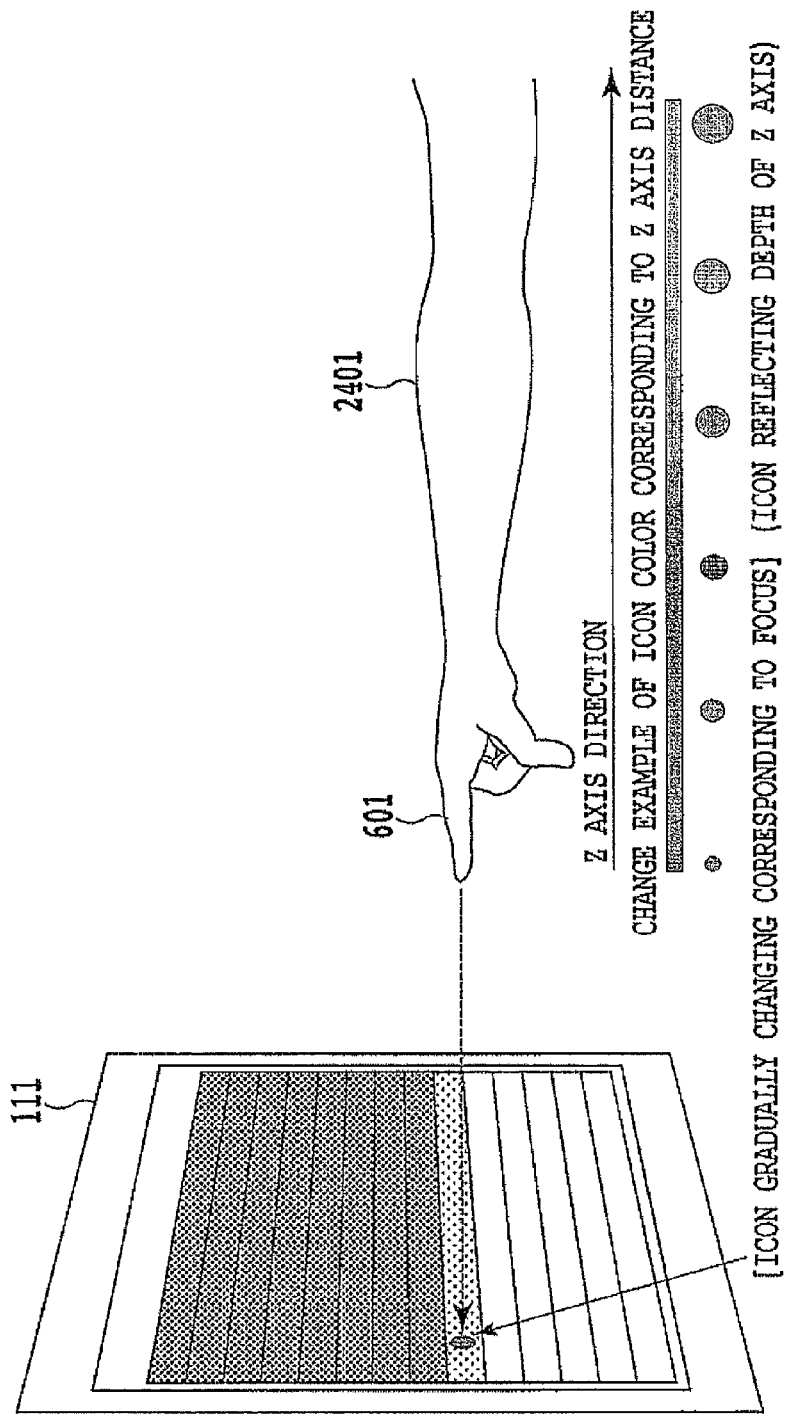
FIG. 22 is a diagram showing a relation between a movement of an operator and an icon displayed on a screen according to an embodiment in the present invention.

Here, among variations of the icon, particularly in a case of changing a color or a density of an icon without changing a configuration thereof so much, as the finger 601 is closer without moving the icon so much as shown in FIG. 22, the color of the icon becomes a color in a warm color group or dense, thus making it possible to fix the input.

Figure 23:
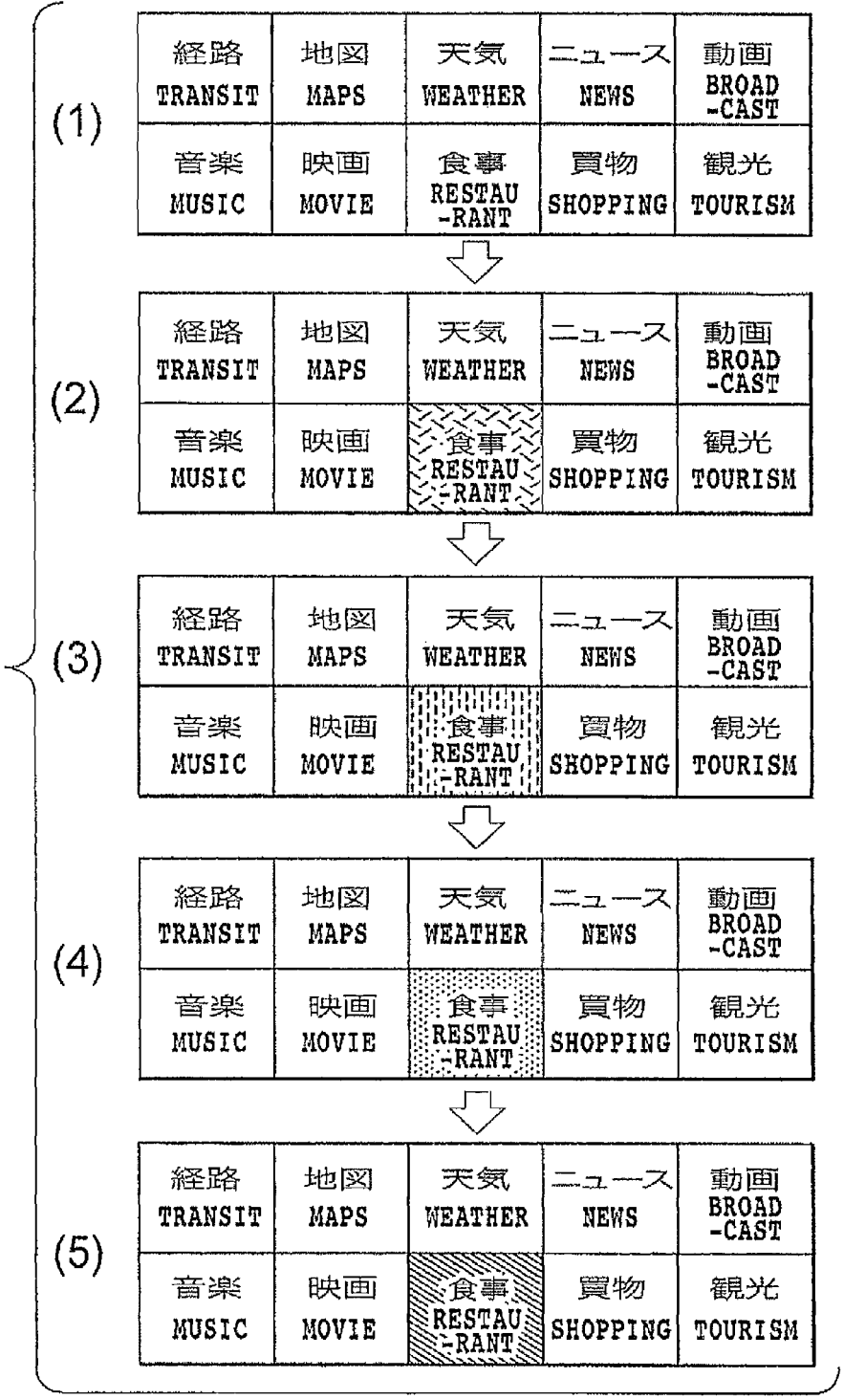
FIG. 23 is a diagram showing a state of a change in color of a menu button in an operation input screen according to an embodiment in the present invention.
Figure 24:
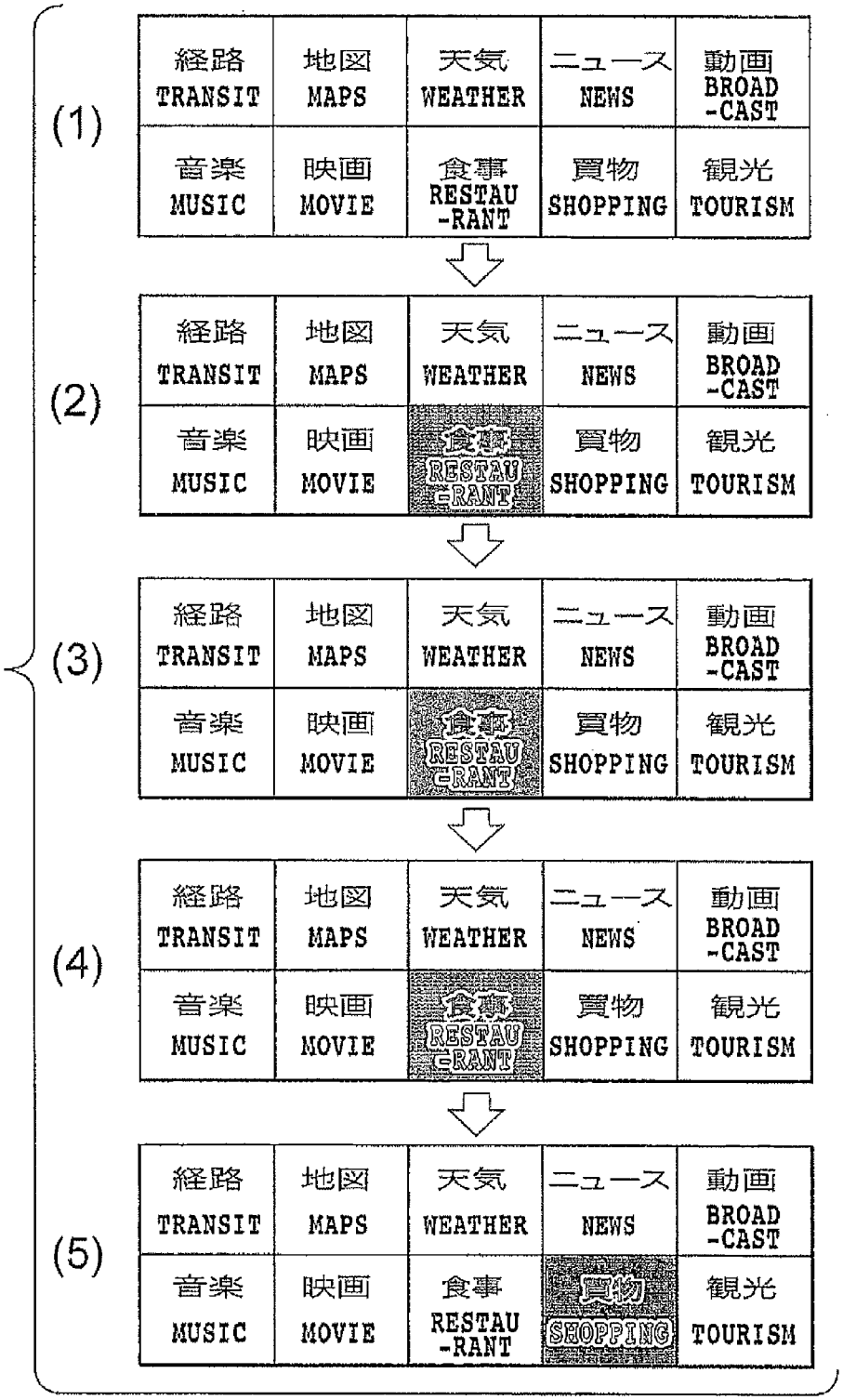
FIG. 24 is a diagram showing a state of a change in light/shade color of a menu button in an operation input screen according to an embodiment in the present invention.

In addition, in the example as described above, for confirming the determination situation of the operation, the icon is displayed and the color or the configuration of the icon is changed in accordance with the movement of the operator, but, for example, as shown in FIG. 23 or FIG. 24, in a case where the position to be pointed is in advance fixed from the beginning as in the case of the menu, without bothering to display the icon, the operation is determined based upon which item button of the menu the position pointed out by the finger 601 is the closest to, wherein by changing a color or a density for filling the pointed item button in accordance with the movement of the finger 601, particularly a distance from the virtual operation screen, the position of the virtual operation screen is more easily comprehended, making it possible to facilitate the operation input. FIG. 23 is a diagram showing an example where as the finger 601 is getting closer, a color of the selected button is changed from a cold color group to a warm color group. In regard to the color selection in this example, the operator can intuitively recognize that the red is fixed by changing the color, such as in the order of (2) blue, (3) green, (4) yellow, and (5) red. Likewise, FIG. 24 is a diagram showing an example of changing a density for filing a button.

Figure 26:
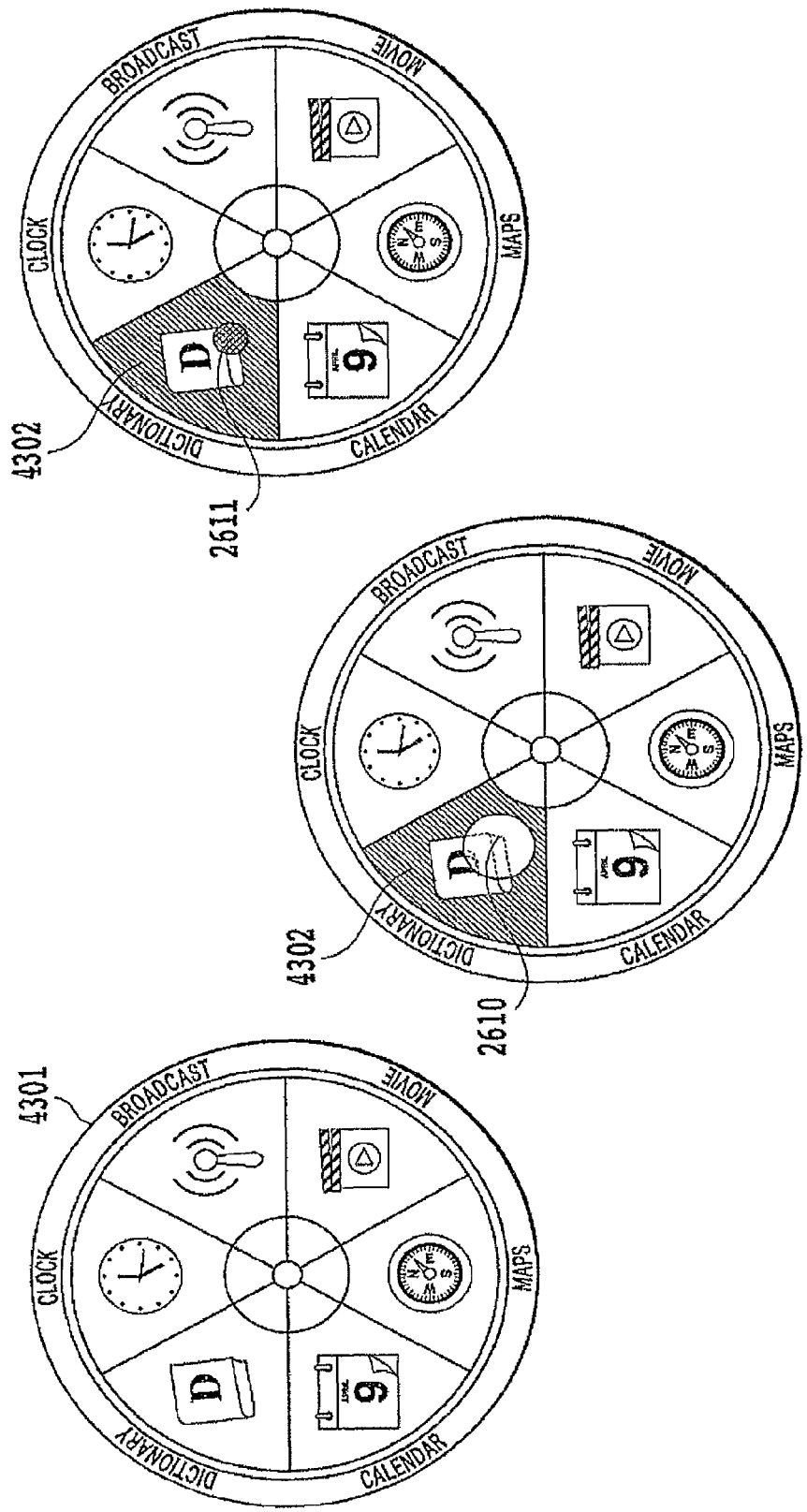
FIG. 26 is a diagram showing a relation between a movement of an operator and a menu displayed on a screen according to an embodiment in the present invention.

As a similar selection example of the menu, there is an example as shown in FIG. 26, which therefore will be explained. For example, as the finger 601 in FIG. 19 enters into a given region on this side of the virtual operation screen 701, a menu 4301 is displayed on the screen and when the finger 601 is closer to the virtual operation screen

Figure 31:
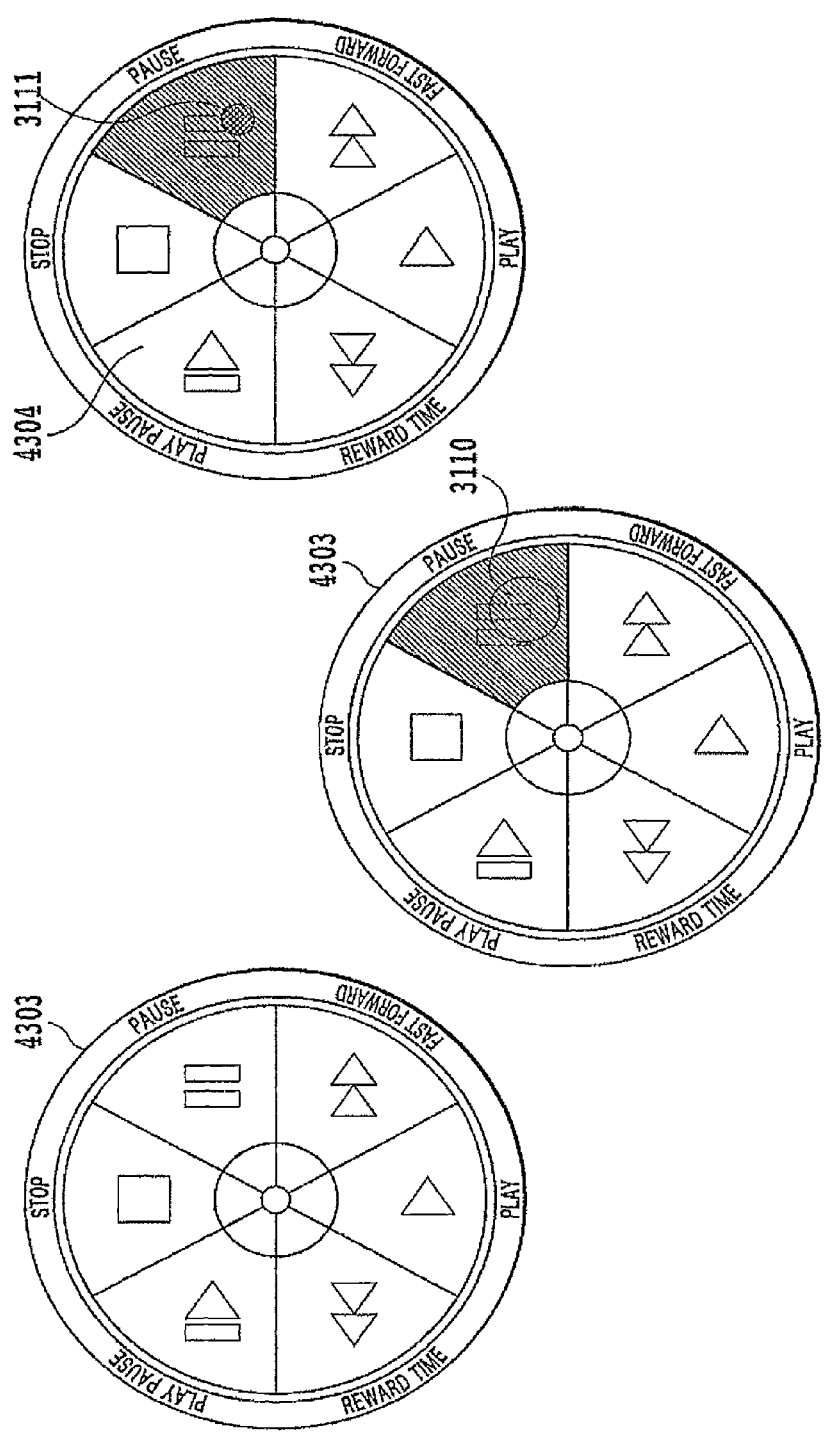
FIG. 31 is a diagram showing a relation between a movement of an operator and a menu displayed on a screen according to an embodiment in the present invention.

701, a large icon 2601 is displayed on an item 4302 of the menu shown in FIG. 26, for example. Thereafter, when the finger 601 reaches to the virtual operation screen 701, the selection of the item 4302 is fixed and a small icon 2611 is displayed, thereby notifying the selection fixation. Thereafter, when, by moving the finger 601 right, left, upward or downward, the selection item of the menu moves and stops in a desired item for a given time, the process in agreement with the selected item can be possibly executed. In addition, when the finger 601 is moved backward of the given region on this side from the virtual operation screen 701 before the selection is performed, the menu can be deleted. FIG. 31 also displays the menu when the finger 601 enters into a given region on this side of the virtual operation screen 701 in the same way as in FIG. 26, which is herein an example of video screen image control. In this example, in the same way as the example in FIG. 26, an operation of the menu is possible by a large icon 3110 and a small icon 3111.

Figure 25:
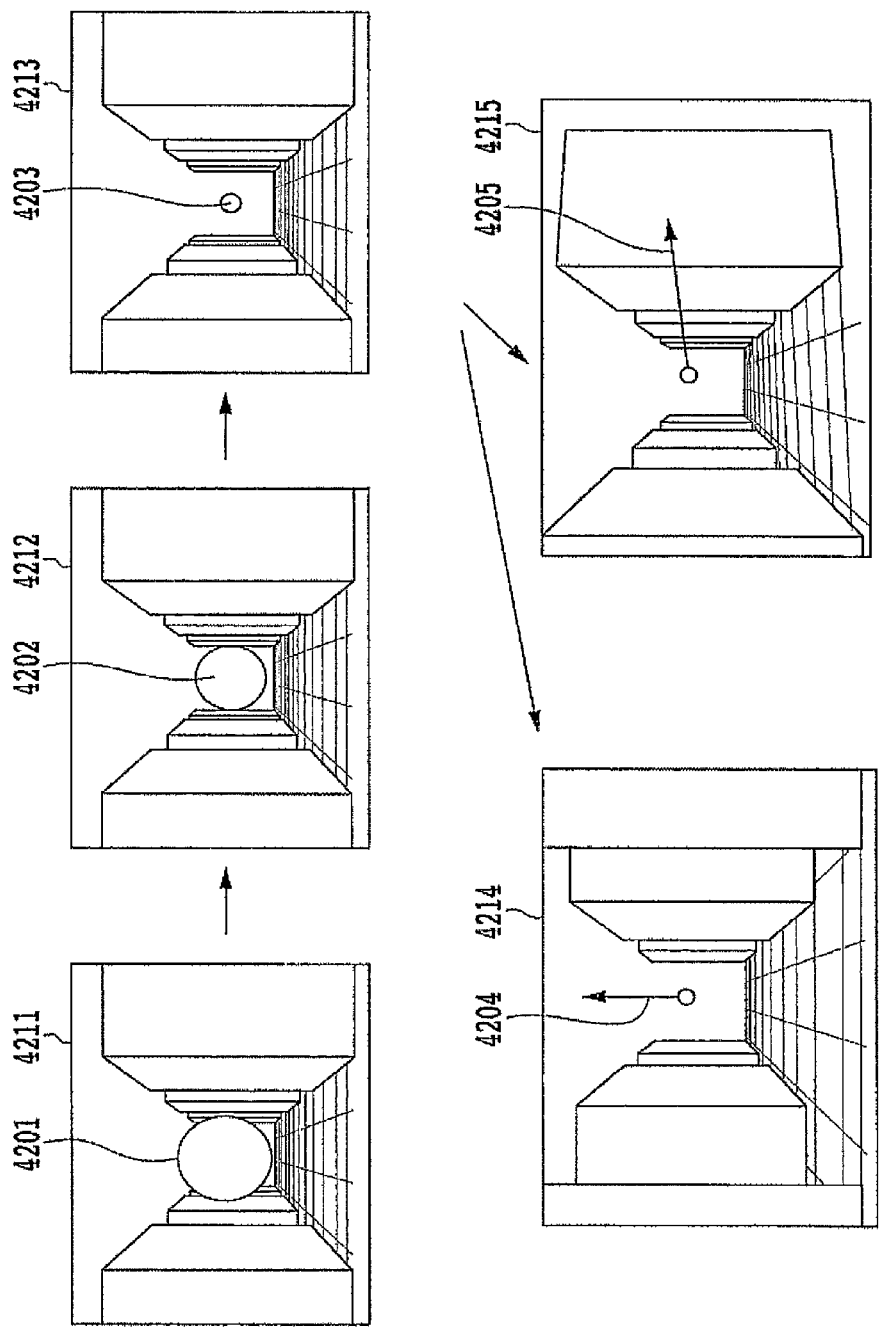
FIG. 25 is a diagram showing a display screen as an example of inputting an instruction for moving a figure displayed on a screen by the present embodiment.

Further, an example of a different input operation will be explained with reference to FIG. 25. FIG. 25 is diagrams each showing a display screen of an example of inputting an instruction for moving a figure displayed on a screen by the present embodiment. The instruction is made by touching a hand or a finger of the operator on the virtual operation screen and moving it. First, as the finger and the like are closer to the screen, an icon 4201 on a screen 4211 is changed to an icon 4202 on a screen 4212 to reduce the icon in size, which shows that the finger is approaching the virtual operation screen. Thereafter, when the finger touches the virtual operation screen, the icon is changed in color as in the case of an icon 4203 on a screen 4213 to be left therein. In that state, when the finger and the like move upwards, a rubber band 4204 on a screen 4214 is displayed to show the movement direction, and thereby the operator can confirm his own operation. In addition, when the finger moves in the right direction, a rubber band 4205 on a screen 4215 can be displayed. The rubber band (arrow mark in the above figure) expanding in accordance with a drag distance of the finger in the upward, downward, right or left direction after the finger reaches the virtual operation screen appears (position of the icon 4203 is fixed until the finger is out of the virtual operation screen), and the moving speed can be changed in accordance with the expanding distance and a moving direction of the icon within a 3D space can be changed in accordance with an expanding angle (tip end of the arrow mark follows the movement of the arm front or finger front).

As described above, in a case where the operator is positioned in the substantially same height with the monitor as shown in FIG. 18, that is, in a case where the virtual operation screen is created to be substantially perpendicular to the front face of the operator in the horizontal direction, the principle of the present embodiment is explained, but this principle is not affected by the position relation between the operator and the monitor or the configuration thereof, and various arrangements or various constructions thereof are possible. For example, the principle can be applied to the arrangement of the system as shown in each of FIG. 10 to FIG. 12. In this case, since the three-dimensional camera 201 and the monitor 111 both are inclined, the arrangement does not basically have a large difference from the aforementioned arrangement in the horizontal direction, but even if the camera is installed in a different position, the position correction is made by any of the methods known in the present technological field, and thereby the position relation between the portion of the operator and the virtual operation screen can be calculated to determine the operation.

(Operation on Deep Side of Virtual Operation Screen—Virtual Operation Layer)

The present embodiment is designed such that an operator performs an operation on a basis of a virtual operation screen created virtually on a space as if an input device such as a touch panel existed therein, thus certainly determining the operation content, but the content of the operation thus determined is determined based upon a position relation between the virtual operation screen and a part of the body such as a hand of the operator or an object worn by the operator, in the deep direction from the virtual operation screen and in a direction away from the operator. For example, the two-layered or three-layered operation region is set as a virtual operation layer in the z axis direction which is a direction away from the operator, and the kind of the operation is determined based upon into which layer the hand of the operator enters, thus determining the operation content from the movement of the hand within the layer. At this time, when the position of the hand, the kind of the operation and the like are displayed on the display screen which the operator virtually recognizes, the operator can further facilitate the recognition of the operation. It should be noted that a distance in the z axis direction between the part of the operator and each of the faces dividing the respective layers can be obtained by the method for calculating a distance between the created virtual operation screen and the part of the operator as described above.

Figure 27:
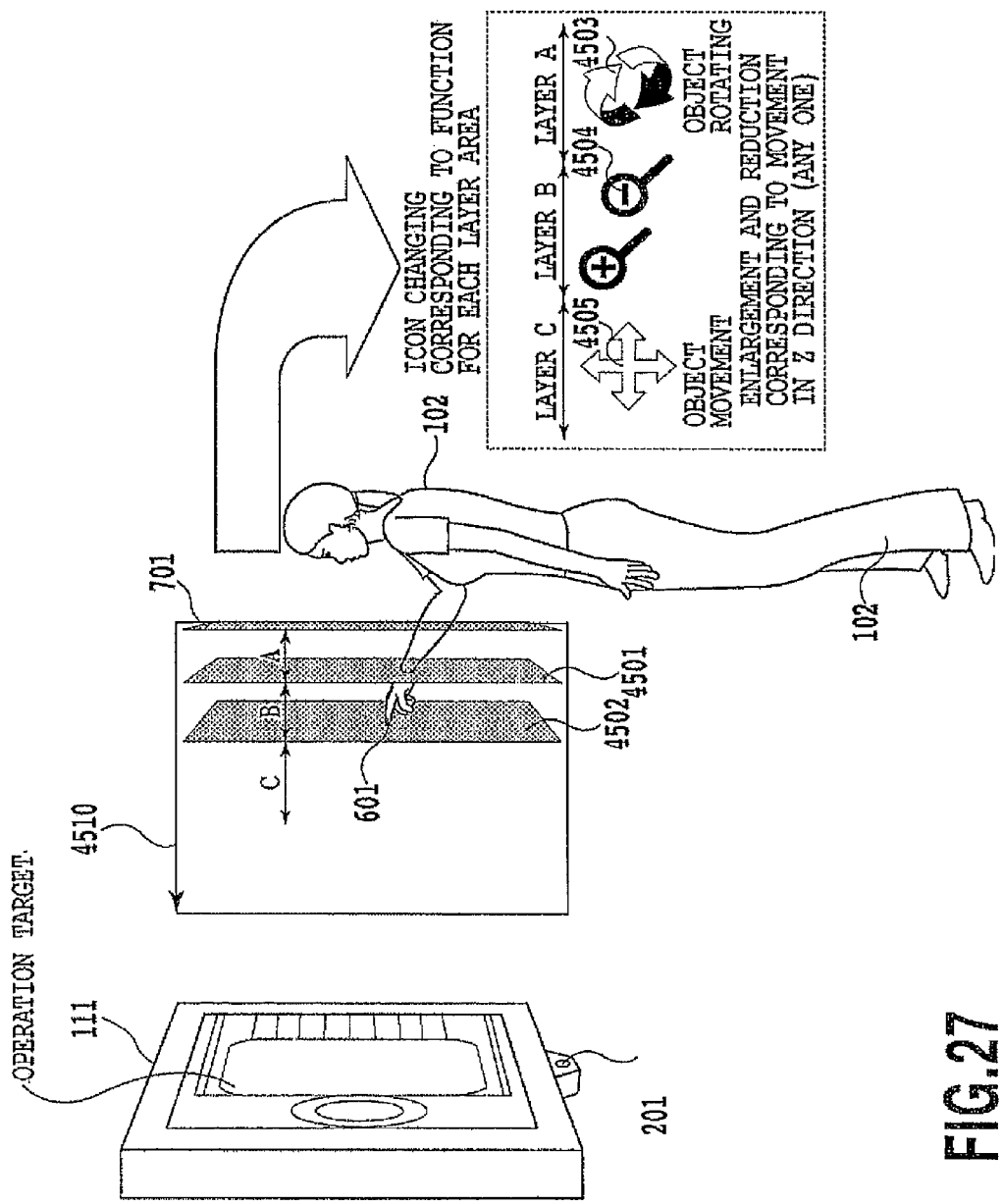
FIG. 27 is a diagram showing a relation between a movement of an operator and a menu displayed on a screen according to a different embodiment in the present invention.

As will be explained more specially, a trigger face 701 shown in FIG. 27 is a virtual operation screen in the present embodiment. According to any of the aforementioned embodiments, when the finger 601 enters in the z axis direction from the trigger face 701, it is determined that the operation is performed. Further, the operation region ahead of the trigger face 701 is divided into three layers of layer A to layer C at a screen 4501 and at a screen 4502, to each of which a different kind of the operation is assigned. In an example in FIG. 27, an operation of rotation of an object is assigned to layer A, an operation of scaling is assigned to layer B, and an operation of transfer of an object is assigned to layer C. The determined operation is performed by the movement of the finger 601 in each layer. For example, in layer A, at the time when the finger 601 passes the trigger face 701, an object pointed around a position shown in an icon showing the finger 601, for example, a rotating icon 4503 is rotated in response to the movement of the finger 601. In layer B, for example, a scaling icon 4504 is displayed on the monitor 111, wherein when the finger 601 is moved in the z direction, the object can be enlarged, and when moved in the opposite direction, the object can be reduced in size.

Likewise, in layer C, a movement icon 4505 is displayed in a position of the finger 601 on the object displayed and pointed on the monitor 111, which can move in accordance with the movement of the finger 601. Here, the screen 4501 and the screen 4502 partitioning the respective layers may be arranged such that each layer has the same thickness or may be arranged such that each layer has a different thickness in accordance with the operation kind assigned to each layer. For example, in the example in FIG. 27, the operation of scaling is assigned to layer B, wherein the movement in the z direction is usually larger as compared to that of layer A or layer C because the scaling is required to be expressed by the forward and backward movements. Therefore, the operation can be facilitated by furthermore thickening layer B.

Figure 28:
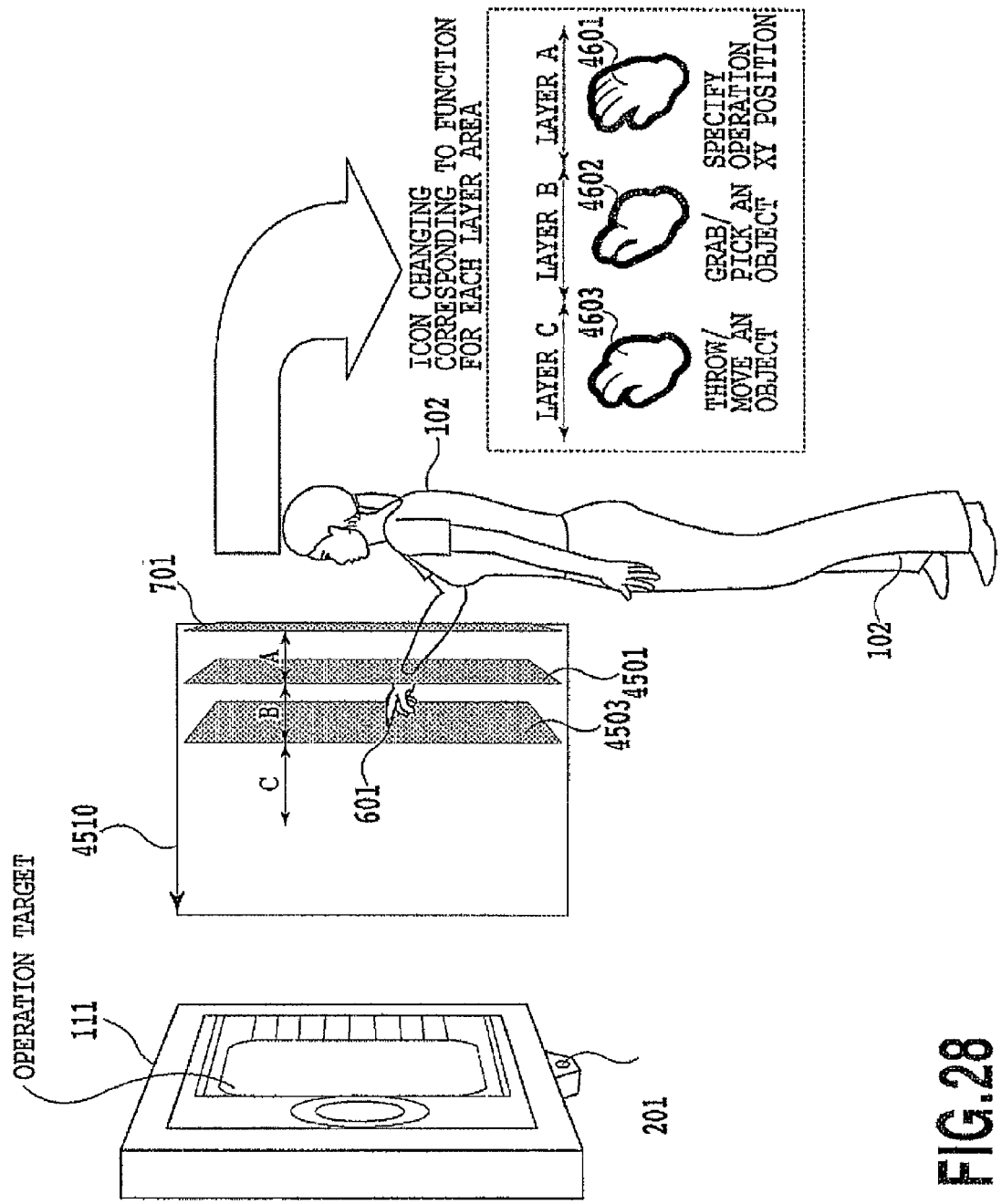
FIG. 28 is a diagram showing a relation between a movement of an operator and a menu displayed on a screen according to a further different embodiment in the present invention.

FIG. 28 is a diagram showing an example of a different icon in the present embodiment. In an example shown in FIG. 28, an operation for specifying an operation position on the monitor 111 is assigned to layer A, an operation for "grabbing" an object in a specified position is assigned to layer B, and an operation for throwing or moving the grabbed object is assigned to layer C.

As explained above, at the time of the determining of the operation content after having been determined as the operation by the virtual operation screen, the kind of the operation can be specified in accordance with not only the movement of the hand or the finger but also the position thereof in the z direction, that is, the virtual operation layer. Therefore, as compared to the determination of the operation where in a case of specifying the operation only by the movement of the finger or the hand, it is required to prepare many various gesture patterns and for the operator to learn them, the operator can perform complicate movements as needed only by a simple movement.

It should be noted that in the aforementioned examples, particularly in the example shown in FIG. 27, the operations for being capable of sequentially carrying out a series of movements of hands, fingers or the like between the respective layers are arranged. However, in a case of being not capable of sequentially performing the operations (example shown in FIG. 28), there occurs a problem of two points as follows. That is, (1) a hand-finger passes the other layer before the hand-finger reaches the virtual operation layer as a target and an instruction which the operator does not desire is given, and (2) in a case of pulling in the hand out of the operation region after the targeted operation is finished, the hand-finger passes the other virtual operation layer, and an instruction which the operator does not desire is given. For avoiding the above problems, for example, the following method and the like will be considered. That is, a multi-sensing state of inserting a hand opposite to a hand for an operation into an operation region (for example, in a state where, in a case where the operation is performed by a right hand, a left hand is inserted into the operation region) is set as a state of absence of an operation (or in reverse, as a state of presence of an operation). Thus it is determined whether or not the operation of each layer is performed, based upon the in/out operation of the hand opposite to the hand for the operation (in this example, the operation determination is made by the operations of both hands, but there are considered various methods such as a method for providing a passing area on an XY plane).

As the present embodiment is used as above, the operator can perform the operation of the system in response to the movement of the operator without in advance learning or arrange gestures, and further, the posture or each part of the operator, for example, the movement of the hand can be comprehended. Therefore, when the present embodiment is applied to a game using an entire body of an operator, a so-called mixed reality (MR) can be realized.

Second Embodiment

Figure 14:
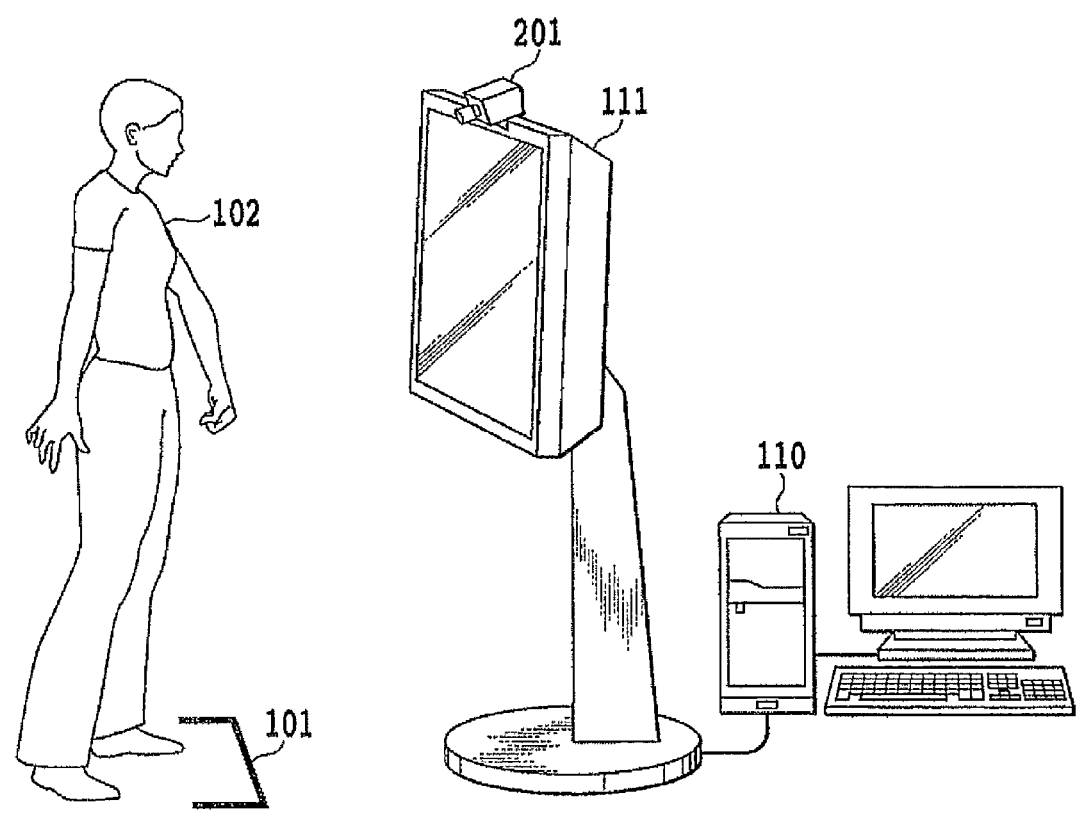
FIG. 14 is a diagram showing an example of an operation input system using a virtual operation screen based upon a marker according to an embodiment in the present invention.
Figure 16:
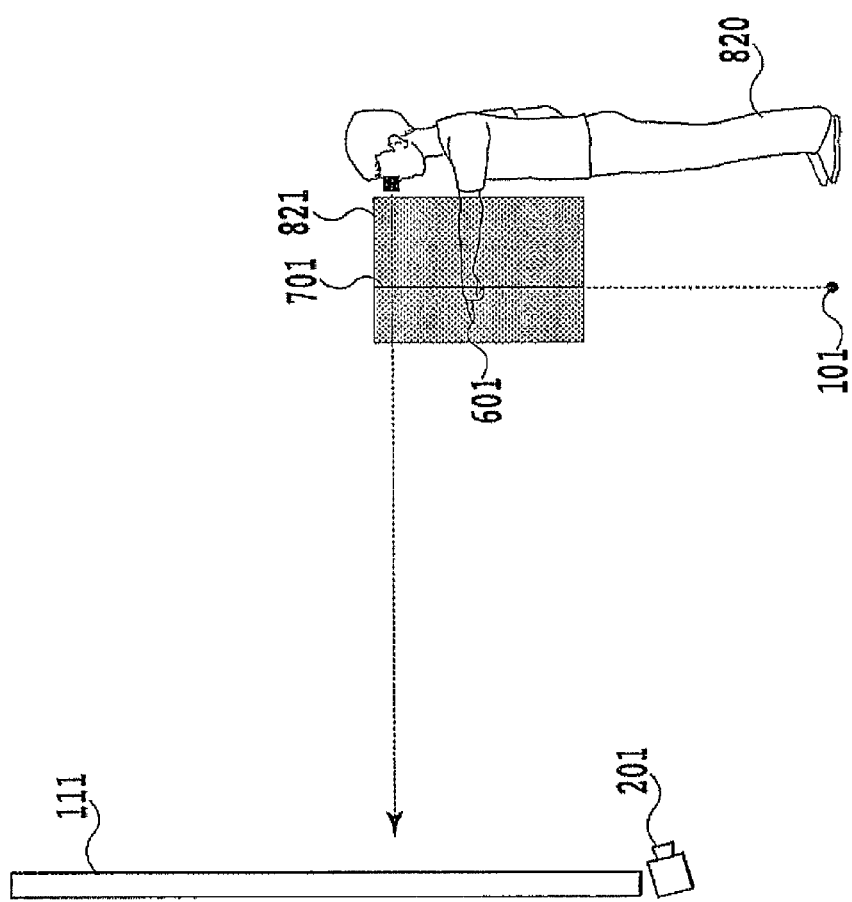
FIG. 16 is a diagram showing an example of adjusting an operation region by a position of a screen or a camera according to an embodiment in the present invention.

The present embodiment is basically the same as the system construction in the aforementioned first embodiment other than an operation screen forming reference. That is, in the present embodiment, a concept called an operation screen forming reference such as a constant marker perceptible by the operator as shown in FIG. 14 is introduced in addition to the system and the process in the first embodiment, facilitating recognition of the virtual operation screen by the operator by putting this as an earmark. That is, the marker 101 shown in FIG. 14 and the like is the operation screen forming reference with which the operator 102 recognizes the virtual operation screen, and the user 102, as shown in FIG. 16, estimates that the operation screen 701 virtually exists above the marker 101 indicated on the floor surface to perform various operations, making it possible to show a gesture by protruding the hand 601 forward using the marker 101 as a reference. A lateral width of the marker 101 may be the same as a width of the operation screen. In addition, a supplementary marker or the like can be used to distinguish the front and the back of the marker, fix an operation region or as a three-dimensional perspective computational element. A configuration and a direction of the marker may be set freely and the marker may indicate an area suitable for the measurement.

In this manner, in the operation input system equipped with the marker 101, as shown in FIG. 16, the operation screen 701 is virtually created above the marker 101. The operator 102 estimates the virtual operation screen 701 from the marker 101 and protrudes the hand 601 into it, or associates the marker 101 with the monitor 111 to estimate a part of the screen and the operation screen 701 as touch panels and moves the hand 601 in such a manner as to touch it, thus facilitating the input operation. In addition, after a user takes any pose in the operation region, the marker can be used as a reference for determination on whether an action is made by a pushing (determination) movement of the hand forward of a line segment or the pushing movement is made after determining the operation. Therefore, the user easily recognizes the touch panel and the operability becomes close to that of the conventional touch panel operation.

Figure 11:
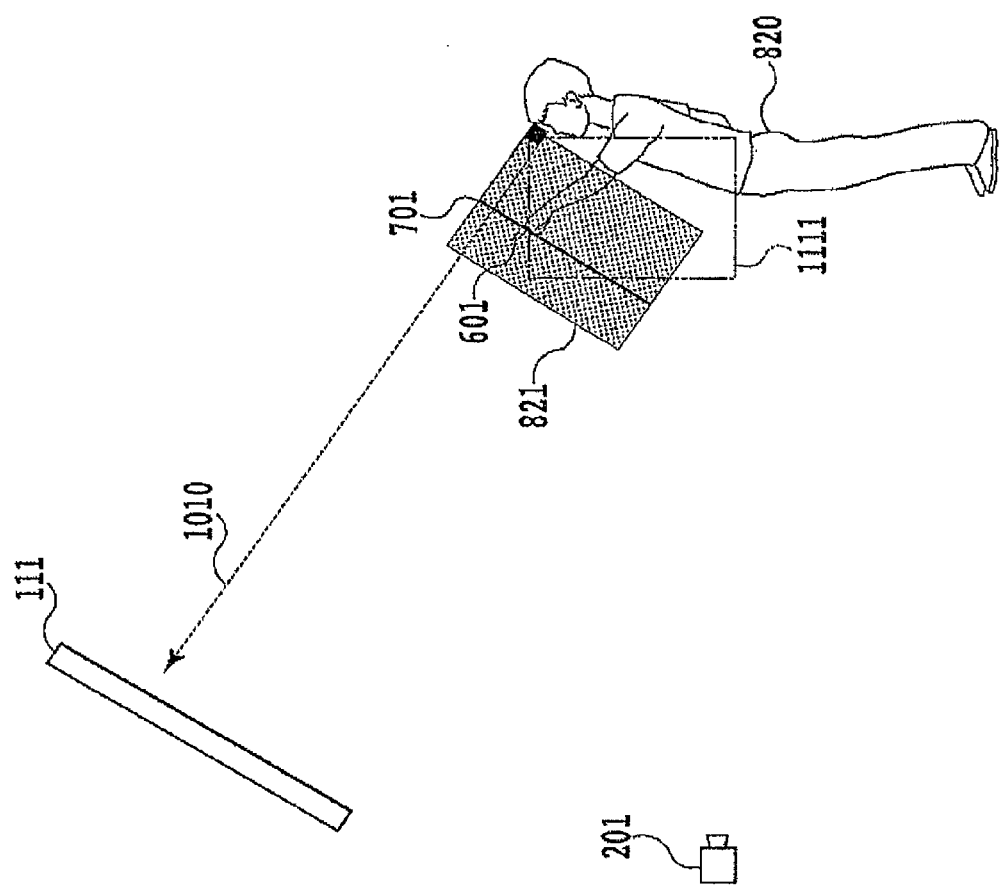
FIG. 11 is a diagram showing a different example of adjusting an operation region by a screen or a position of a camera according to an embodiment in the present invention.

In the present embodiment, the virtual operation screen is shown to be vertically created right above the marker by referring to FIG. 16 and the like, but in a case of the arrangement in the system shown in FIG. 9 to FIG. 11, for example, the bottom section of the virtual operation screen only may be matched to the operation screen forming reference to incline an entirety of the virtual operation screen or a position of the virtual operation screen to be created may be changed to match the body length. In this case, for example, first, a predetermined operation screen may be calculated by the marker 101, which is thereafter corrected by an image of the operator, thus adjusting a virtual operation screen to be created in an appropriate position. Alternatively the operation screen is calculated based upon the calculated position of the marker 101 and each preset position of the monitor 111 and the camera 201, and further, a body length, a length of an arm and the like are extracted from an image of the operator. These pieces of information can be added to the operation screen to correct the position, the size, and the angle of the virtual operation screen.

Figure 29:
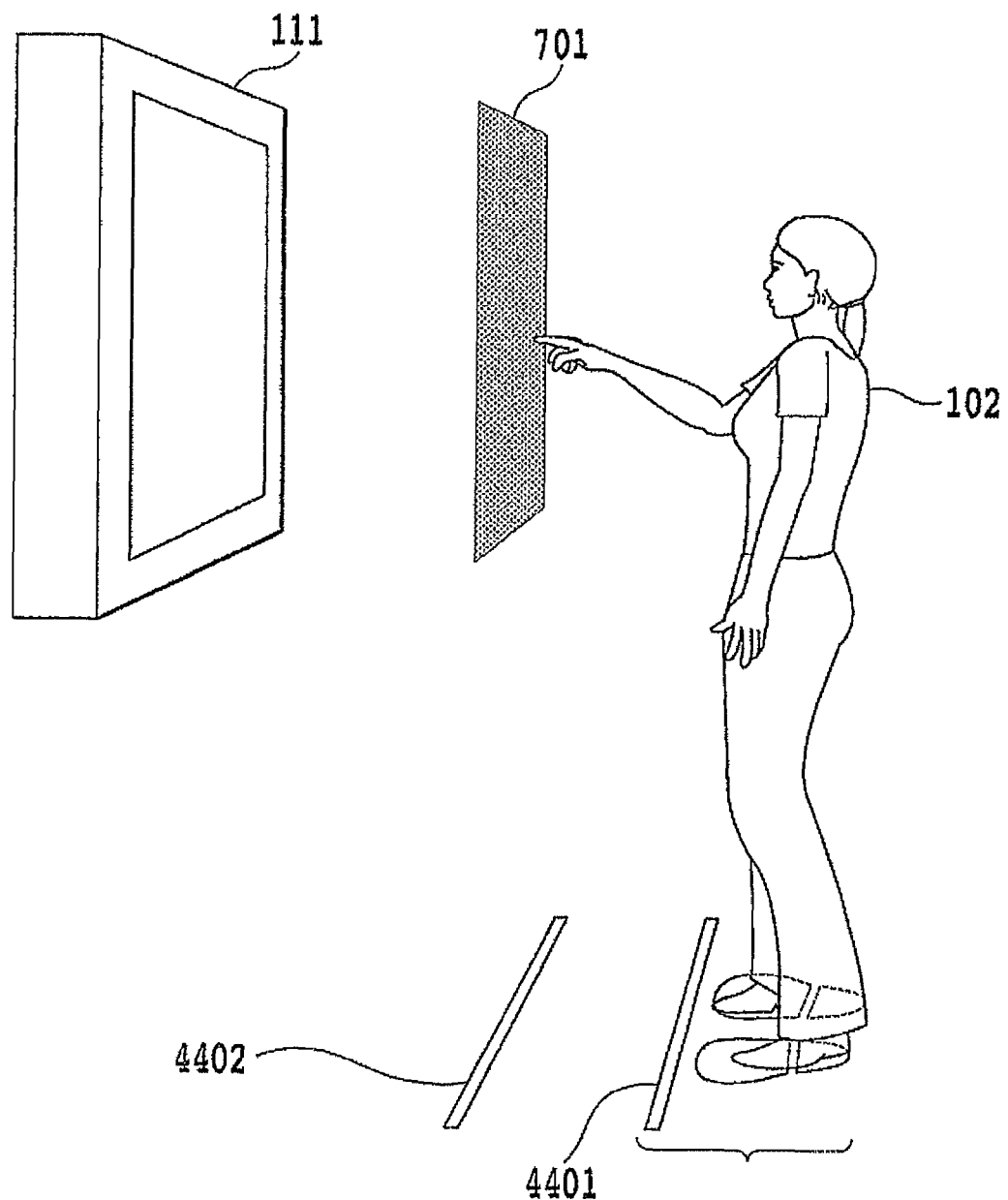
FIG. 29 is a diagram showing a state of a virtual operation screen and an operation screen forming reference according to an embodiment in the present invention.

In addition, the marker as the operation screen creating reference is visible, and the operator visualizes the marker and uses it as a reference to estimate a position where the virtual operation screen generally exists, thus performing the operation. Therefore, it is required to create the virtual operation screen above the marker, but there is a possibility that a position relation between the front and the back as viewed from the operator changes with a situation of the operator or the entire system. Generally, as shown in FIG. 29, for example, in a case where a marker 4401 is arranged on the floor surface or the like, it is thought that in many cases, the operator stands near a position right above the marker 4401 according to positions of eyes of the operator 102. Therefore, it is thought that there is case where when the virtual operation screen 701 is created in a position 4402 shifted slightly to an opposite side to the operator 102 from the marker 4401, the movement of the arm can have more room to perform a natural operation. On the other hand, in a case where markers 1902 are attached on an edge of a desk shown in FIG. 15 to be described later, the movement of the operator is limited by an edge in the opposite side to the edge on which the markers are attached. That is, since the operator is not permitted to approach the body to the face ahead of this edge, a width of the desk can be appropriately determined to be easily controlled. In this case, it is thought that the virtual operation screen can be more easily recognized by the operator when the virtual operation screen is created right above the marker. In the present embodiment, a length of the operator arm is measured to set positions in front and in back of the virtual operation screen, but it is possible to create a more objective operation screen by the marker perceptible by the operator.

In this manner, in the aforementioned first embodiment, the operation region including the virtual operation screen is set in consideration of a stroke of the arm or the like, but by combining various markers, the operation region can be fixed more objectively, that is, in such a manner that any operator can visually recognize the operation region with constant accuracy.

Further, according to the operation screen forming reference as in the case of the present embodiment, since the measurement markers are widely, appropriately and simultaneously spread and arranged on the captured screen, the measurement with very high reliability is possible. In addition, the operation screen forming reference has such an effect and can be also used together with a calibration system ensuring that the marker is always present within a photography range of the camera, realizing a space saving and multi-functional apparatus. After the calibration at an initial installment, basically it is not necessary to perform re-measurement for each time.

The marker 101 is thus photographed by the video camera 201 to function as the operation screen forming reference, and, for facilitating the photographing of the marker 101, although various materials known in the present technological filed can be used as a marker material, the marker material suitable for a camera in use is usually selected. In a case of a regular camera, coloring having properties so as to show up from the background color is necessary, and in a case of using an infrared ray camera, a retro-reflective material or the like may be used. On the other hand, since in laser light, reflective light is difficult to be measured in a case of a color or material with less reflection such as a black portion, a bar in black or the like is used without using the marker or the retro-reflective material by the laser light. Thereby, since a portion irradiated with the laser light is not reflected to produce a defect on the screen, a position of the bar can be detected also in this manner.

For example, in a case of attaching a marker with constant coloring, specially the marker can be extracted by the following process. In the image reading unit 301, data photographed by the video camera 201 is read and a color region in advance determined as a marker in the marker 101 is extracted from the data by the image extracting unit 302 in a case of a color image, for example, extracting only an image in the marker 101. Specially in the present embodiment, upper and lower threshold values are set to each of a brightness signal Y of a color NTSC signal and color-difference signals U and V to extract pixels satisfying all the threshold values, but, not limited thereto, any of methods known in the present technological field can be used. In this manner, the position of the marker is recognized in a three-dimensional way to calculate what kind of a virtual operation screen will be created, storing that virtual operation screen in a data base. When the color extraction is completed, in a case where a supplementary marker is further present, the supplementary marker is also extracted with the similar process. Thereafter, the extracted marker portion is binarized in black and white by the position at the image calculating unit 303 to calculate the number of pixels constituting vertical and horizontal sections of the marker extracted from the image photographed by the video camera 201. A length or an inclination of each of the vertical and horizontal sections of the obtained image is compared with that of the image as a reference to calculate a distortion or a scale of a photography space. In the present embodiment, in a case of calculating the distortion or the scale, markers are provided in at least four locations in addition to the above, which may be used as reference points. For example, when four or more reference points are present, these points are connected to make line segments, and it is possible to perform the calibration.

The marker can be used by attaching an appropriate material on the floor surface, but, not limited thereto, may be applied directly on the floor surface or used with any attachment method known in the present technological field. In addition, in the above explanation, the marker 101 is used as the operation screen forming reference, but not limited thereto, any material or structure may be used as a stereoscopic measurement reference. For example, the marker is not shaped as shown in FIG. 1, but may be shaped in various figures and a plurality of markers each having a constant area may be used in some points.

Figure 15:
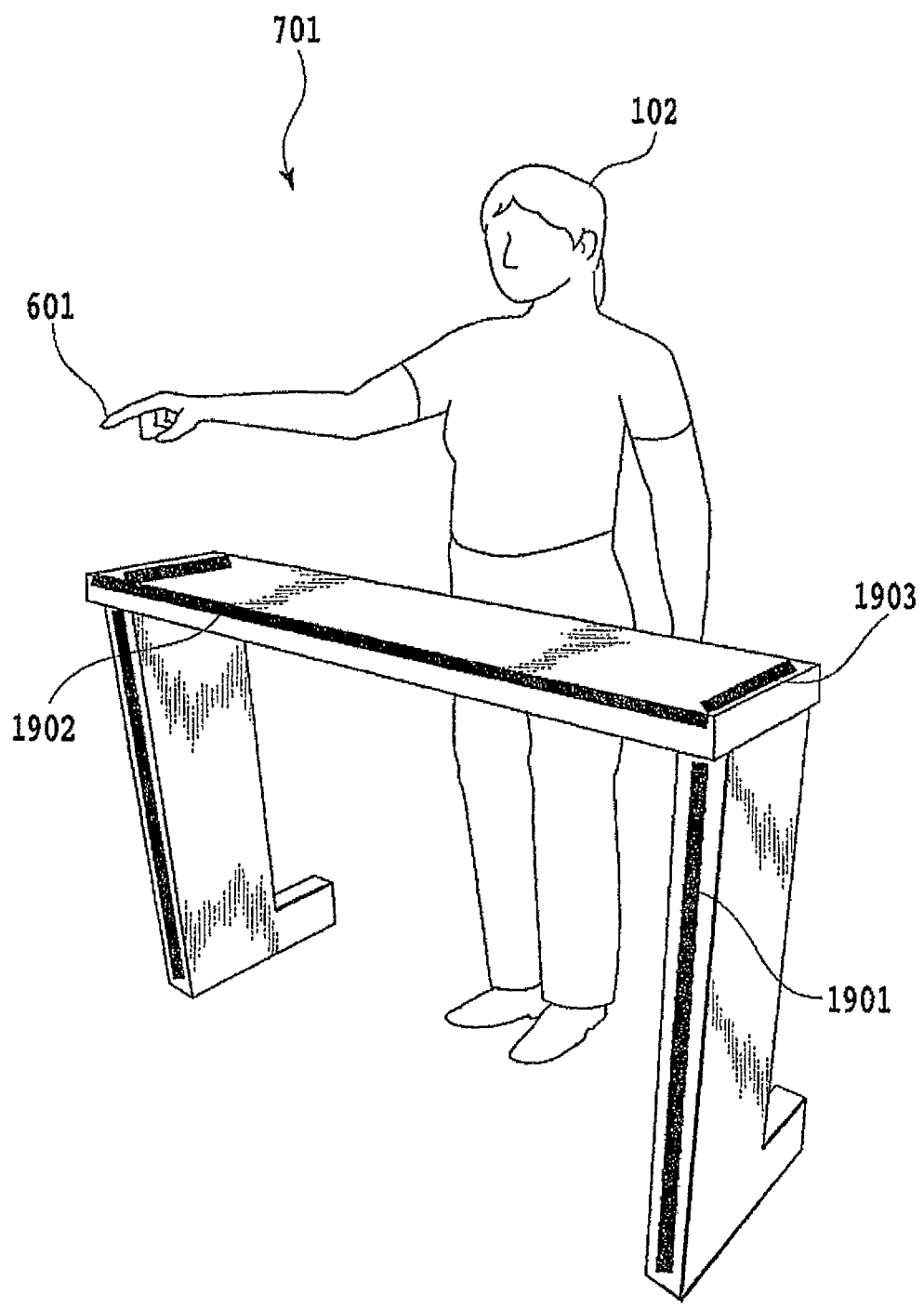
FIG. 15 is a diagram showing an example of a special operation of an operation input method according to a different embodiment in the present invention.

In addition, in regard to the operation screen forming reference, markers 1902 and 1903 are attached to a stereoscopic object, for example, a stereoscopic object 1901 in a desk shape as shown in FIG. 15, which is used as the operation screen forming reference to create the virtual operation screen 701. The input operation is possible by performing the operation to the virtual operation screen 701 with the finger 601, for example. It should be noted that, by referring to FIG. 16, a configuration of the virtual operation screen is created in a rectangular shape provided perpendicularly from the floor surface, but not limited thereto, the operation screen having various configurations and sizes can be created depending on a configuration or an arrangement method of the marker 101. For example, since the marker 101 shown in FIG. 16 is a straight line having a constant length in parallel to a plane of the monitor 111, the virtual operation screen is created as similar to the operation screen 701, but the marker may be created as a straight line having a constant oblique angle. In this case, a configuration of the marker is the same as that of the operation screen 701 shown in FIG. 16, but the operation screen is placed in such a manner that an orientation thereof has a constant oblique angle to the monitor 111. In this case also, the operator 102 can comprehend that the operation screen obliquely arranged by the marker is virtually created, the operator may perform the operation in consideration of the operation screen. In addition, by stereoscopically arranging the supplementary marker, an inclined operation screen having a constant angle to the floor surface or a curved operation screen may be created. It should be noted that in the present embodiment, an explanation is made in such a manner that the virtual operation screen created by the marker or the like is used as a reference to perform the process, but as persons skilled in the art can understand, a position of the operator may not be calculated from the operation screen in an actual calculation process. Because the virtual operation screen is absolutely provided for the operator to perform the operation input with an intention.

In a case of using a standing platform with markers as shown in FIG. 15, as shown in FIG. 18 to be described later, for example, by setting only an upper body of the operator 102 as a target area 2301 using the marker 1903, only a movement of a portion protruding forward out of the virtual operation screen 701 can be also determined as the operation. By doing so, in a case where the operator performs the input operation by using the standing platform as shown in FIG. 15 as the support of the body, even if a lower body, particularly a leg is forward out of the virtual operation screen, only the movement of the upper body can be absolutely recognized as a target of the operation.

In a case of creating the virtual operation screen and the like using the operation screen forming reference, after setting a reference screen and a measurement area with measurement by a stereoscopic marker, the stereoscopic marker is removed, and thereafter it is possible to install only the marking such as lines on the floor in such a manner that the produced reference screen can be recognized. Under an environment always not suitable for installing the stereoscopic marker, such as a narrow place difficult to leave the stereoscopic guide bar and the like, a method of creating such a virtual operation screen is effective. In addition, in a case of a floor flat calibration pattern, depending on an installment angle of a three-dimensional camera, since there is a case where the measurement is more difficult as compared to the stereoscopic calibration or there is a tendency that selection of a superior material with appropriate properties (wear resistance, slip prevention, and the like) in floor surface use is difficult, the marking is more easily implemented by replacing it for a simple floor marking without the calibration. Further, as similar to the above, after the measurement, a stereoscopic guide without the calibration function (marker) is provided for replacement. It is effective in a case of placing importance on a design or as a replacement for a less expensive type, and the user can recognize the stereoscopic guide likewise.

Any of the above cases is a method where the user can recognize the position after the calibration and another means (stereoscopy or planar face) leading to the movement limitation is provided for replacement. Further, without relying on a calibration method in only a camera side, a reference screen is in advance set in a distance or in a position easy to use and thereafter, a floor line or a stereoscopic guide is installed on the reference screen (area) such that the user side can recognize it.

Here, a relation between the marker and the virtual operation screen in the present embodiment will be explained with reference to FIG. 29. In the present embodiment, a marker is basically attached to an edge of a desk or a platform and an operator makes contact with a virtual operation screen created above the marker or moves his hand thereto, which makes the system recognize the input operation. At this moment, an edge of the desk or the platform on which the marker is not attached limits the movement of the operator and supports that a hand of the operator appropriately raised makes natural contact with the virtual operation screen. When this concept is explained with reference to FIG. 29, the virtual operation screen 701 is created above a marker 4402 as the operation screen creating means, but, on the other hand, the operator 102 is present to keep a given distance from the virtual operation screen by some movement limiting means 4401 and the operation can be performed to the virtual operation screen by the hand 601 naturally put forward. In the present embodiment, the virtual operation screen 701 is created right above the marker 4402, but may be moved forward and backward on a basis of the marker 4402 as described in the first embodiment. For example, since the movement limiting means 4401 is basically fixed, when the virtual operation screen is created right above the marker 4402, there is a possibility that the operator 102 is positioned too near to or too far from him depending on the body shape of the operator 102, which deteriorates the use feeling. In this case, a position in which the virtual operation screen is created may be moved forward or backward from the marker 4402 for each operator.

As described above, according to the present embodiment, since the virtual operation screen is created based upon the operation screen forming reference perceptible by the operator and the image of the operator himself photographed by the three-dimensional camera, the position of the virtual operation screen is objectively easy to be specified and is set in consideration of the length of the operator and the like. Therefore, the operator can obtain a natural operation feeling without discomfort.

Third Embodiment

Figure 30:
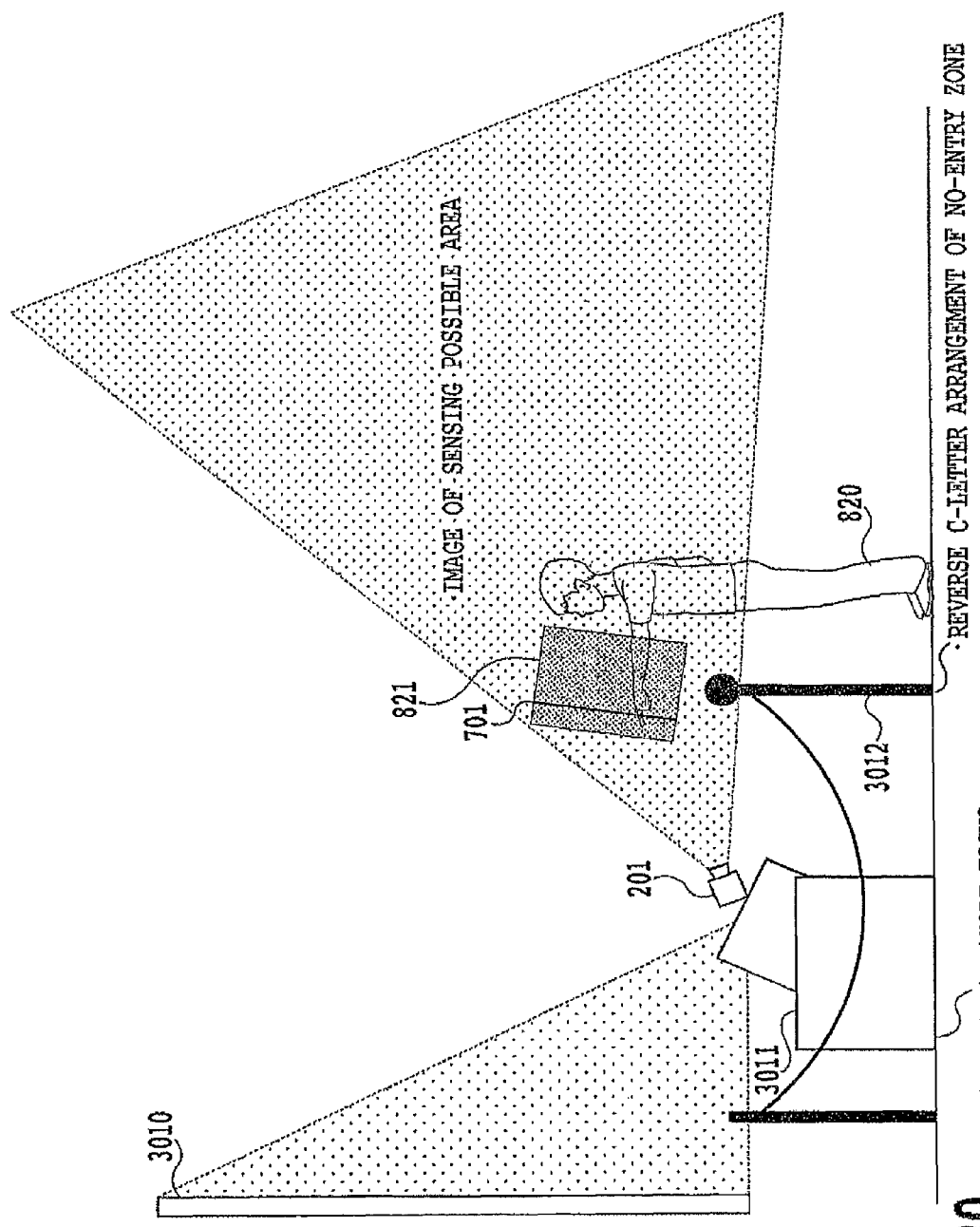
FIG. 30 is a diagram showing an example of adjusting a screen by a projector or an operation region by a position of a camera according to an embodiment in the present invention.

The present embodiment is basically the same as the system construction of each of the first and second embodiments, but differs in a point of using a projector as a display device instead of the monitor. That is, the present embodiment is basically the same process with each of the first and second embodiments and projects a screen image on a screen 3010 from a projector 3011 as shown in FIG. 30 instead of the monitor 111 such as LCD or plasma to inform various pieces of information of the operator. In the system of the present embodiment, since only the screen is arranged on the display face on which LCD and the like are arranged in the first embodiment and the like, the projector 3011 for projecting the screen image, the camera 201 and the computer for controlling them can be formed as a one-piece type as shown in FIG. 30. Since such a one-piece type system is regularly placed between the operator and the screen, for example, guide bars 3012 is placed for recognizing a no-entry zone as shown in the figure, and may be used also as the operation screen forming reference as in the second embodiment.

The present embodiment differs only in the display method from the first embodiment, but does not differ greatly in the display face itself. Therefore, the settings of the virtual operation screen and the operation region, the determination process of the operation and the like are basically the same as in the first and second embodiments. However, since the one-piece unit of the projector, the camera, and the computer is, as described above, arranged between the operator and the display face (screen 3010), a position of the camera 201 differs slightly. Therefore, in comparison with a case of the first embodiment where the camera is arranged at the lower part of the display face or the like, an adjustment width of an angle in the operation region or the like becomes larger. In addition, a position relation between the guide bar 3012 and the virtual operation screen 701 differs from a case explained in the second embodiment, wherein the virtual operation screen 701 is not necessarily created right above the guide bar 3012. This is because, for example, although the function as the operation screen forming reference is the same between the marker drawn with an intention on the floor as the constant marker 101 perceptible by the operator as shown in FIG. 14 and the guide bar 3012 in the present embodiment serving also as entry prevention, a position for creating the virtual operation screen differs depending on a position to the operator and a relation with the operator. By using any knowledge known in the present technological field, the virtual operation screen can be created forward or backward on a basis of the guide bar 3012 corresponding to the system.

As described above, since the projector, the camera, and the computer can be formed as the one-piece unit by using the projector for display in the present embodiment, the installing and the handling can be easy. Therefore, in a case where the screen is sized to be large, the present embodiment has an advantage in a point of the installment easiness and the expense as compared to a case of using large-sized LCD.

The invention claimed is:

1. An image recognition apparatus comprising:
   a first component configured to create an operation region between a three-dimensional photography device and an operator based on a position of the operator taken by the three-dimensional photography device;
   a second component configured to detect a change of the position of at least a part of the operator in the operation region based on the position of at least a part of the operator taken by the three-dimensional photography device; and
   a third component configured to output, based on the detected change of the position of the at least a part of the operator in the operation region, a signal to change a mark displayed in a display device, the display device being visually recognized by the operator,
   wherein a function associated with the mark is selected when the part of the operator moves a predetermined amount toward the function.

2. The image recognition apparatus according to claim 1 wherein the third component determines an operation by the operator based on the detected change of the position of the at least a part of the operator in the operation region to output a signal to change a mark displayed in a display device, the display device being visually recognized by the operator based on the result of the determination.

3. The image recognition apparatus according to claim 1 wherein the first component creates an operation region at a timing when the body of the operator has stopped for a given time.

4. An image recognition apparatus comprising:
   a first component configured to create an operation region between a three-dimensional photography device and an operator based on a position of the operator taken by the three-dimensional photography device;
   a second component configured to detect a change of the position of at least a part of the operator in the operation region based on the position of the at least a part of the operator taken by the three-dimensional photography device; and
   a third component configured to output, based on the detected change of the position of the at least a part of the operator in the operation region, a signal to change a mark displayed in a display device, the display device being visually recognized by the operator,
   wherein a function associated with the mark is selected when the part of the operator enters into a predetermined area corresponding to the function.

5. An image recognition apparatus comprising:
   a first component configured to create an operation region between a three-dimensional photography device and an operator based on a position of the operator taken by the three-dimensional photography device;
   a second component configured to detect a change of the position of at least a part of the operator in the operation region based on the position of the at least a part of the operator taken by the three-dimensional photography device; and
   a third component configured to output, based on the detected change of the position of the at least a part of the operator in the operation region, a signal to change a mark displayed in a display device, the display device being visually recognized by the operator,
   wherein a function associated with the mark is selected when the mark becomes a particular mark.

\* \* \* \* \*